US005539193A

United States Patent [19]
Gibbs et al.

[11] Patent Number: 5,539,193
[45] Date of Patent: *Jul. 23, 1996

[54] MODULAR HAND-HELD DATA ENTRY SYSTEM

[75] Inventors: William T. Gibbs; Robert G. Geers; Ronald L. Mahany; Richard C. Arensdorf; George E. Hanson; Arvin D. Danielson; Glen S. Adams; James R. Hutton; Darald R. Schultz; Keith K. Cargin; Steven E. Koenck; Phillip Miller; Dennis A. Durbin; Darrell L. Boatwright, all of Cedar Rapids; Stephen J. Kelly, Marion; Alan G. Bunte, Cedar Rapids, all of Iowa

[73] Assignee: Norand Corporation, Cedar Rapids, Iowa

[*] Notice: The term of this patent shall not extend beyond the expiration date of Pat. No. 5,418,684.

[21] Appl. No.: 251,844

[22] Filed: May 31, 1994

Related U.S. Application Data

[63] Continuation of Ser. No. 877,324, May 1, 1992, abandoned, and a continuation-in-part of Ser. No. 777,393, filed as PCT/US90/03282, Jun. 7, 1990, Pat. No. 5,410,141, which is a continuation-in-part of Ser. No. 364,902, Jun. 8, 1989, abandoned, and Ser. No. 364,594, Jun. 7, 1989, abandoned, said Ser. No. 877,324, is a continuation-in-part of Ser. No. 866,642, Apr. 3, 1992, abandoned, which is a continuation-in-part of Ser. No. 816,888, Jan. 3, 1992, abandoned, which is a continuation-in-part of Ser. No. 809,380, Dec. 18, 1991, abandoned, said Ser. No. 866,642, is a continuation-in-part of Ser. No. 633,500, Dec. 26, 1990, Pat. No. 5,202,817, which is a continuation-in-part of Ser. No. 626,711, Dec. 12, 1990, abandoned, which is a continuation-in-part of Ser. No. 364,594, and Ser. No. 364,902.

[51] Int. Cl.$^6$ ..................................... G06K 7/10
[52] U.S. Cl. .......................................... 235/472; 235/454
[58] Field of Search ..................................... 235/454, 472

[56] References Cited

U.S. PATENT DOCUMENTS

| 4,158,194 | 6/1979 | McWaters et al. | 235/454 |
| 5,191,197 | 3/1995 | Metlitsky et al. | 235/472 |

*Primary Examiner*—Harold Pitts
*Attorney, Agent, or Firm*—Henderson & Sturm

[57] ABSTRACT

A hand held data entry apparatus having a body for receiving, storing and transmitting information, including a camming mechanism for quickly sealingly attaching an accessory such as a scanner to the top of a hand held data entry apparatus. Additionally, a similar camming mechanism is utilized to hold a battery pack in place with the additional feature of not only pulling the battery pack securely against the housing, but also pushing the battery pack contacts into abutment with complementary contacts disposed within the housing. A keypad is provided for permitting information to be manually entered into the hand held body and this keypad is encased in a layer of elastomeric material such as silicone. A pair of LED's are utilized, one to indicate a "good scan" and the other to indicate something else, such as a "bad scan." Additionally, these LED's can be encased in operative or dummy keys in order to save keyboard space. A mechanism is provided for pivoting the scanner about either of two perpendicular axes.

5 Claims, 14 Drawing Sheets

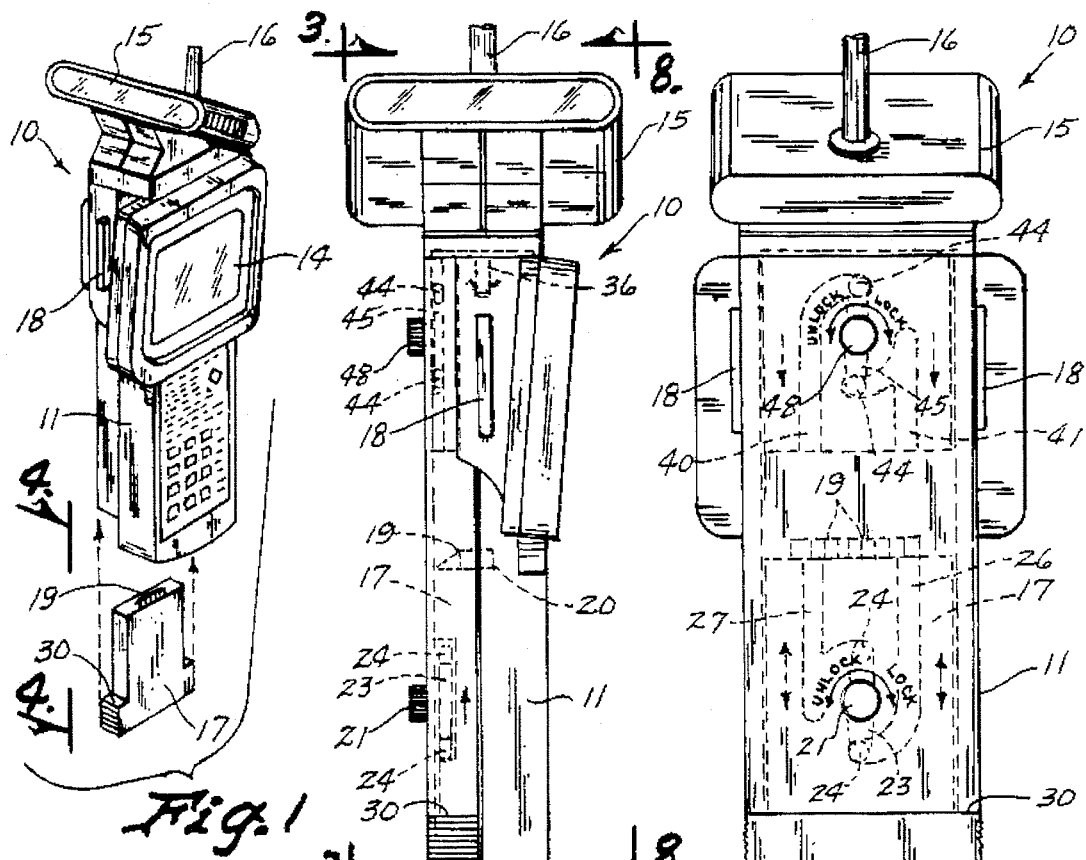
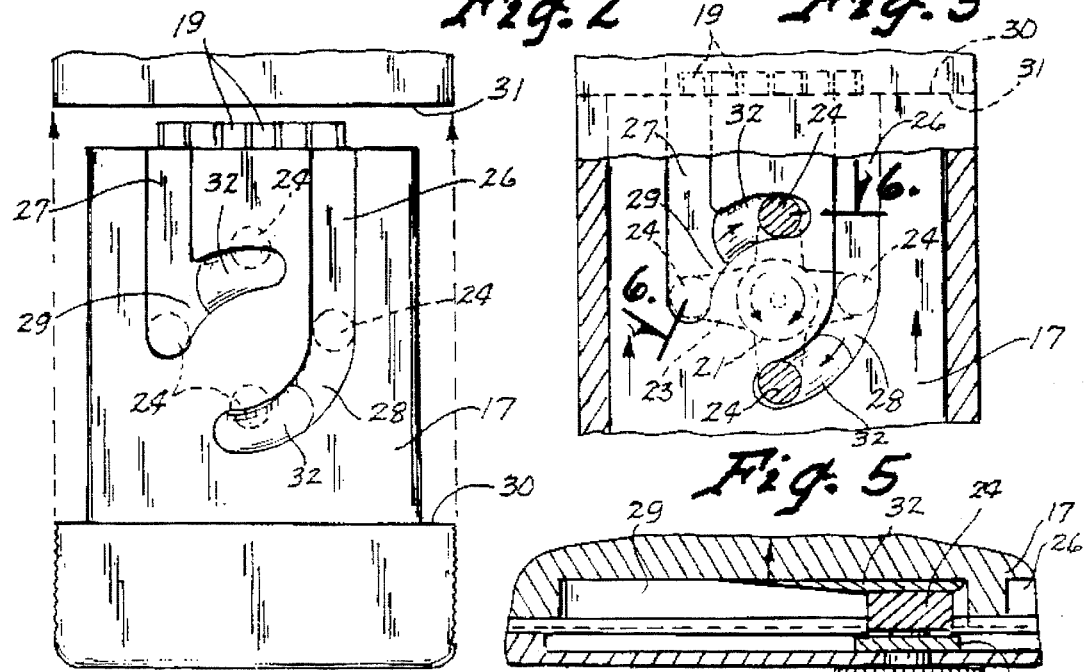

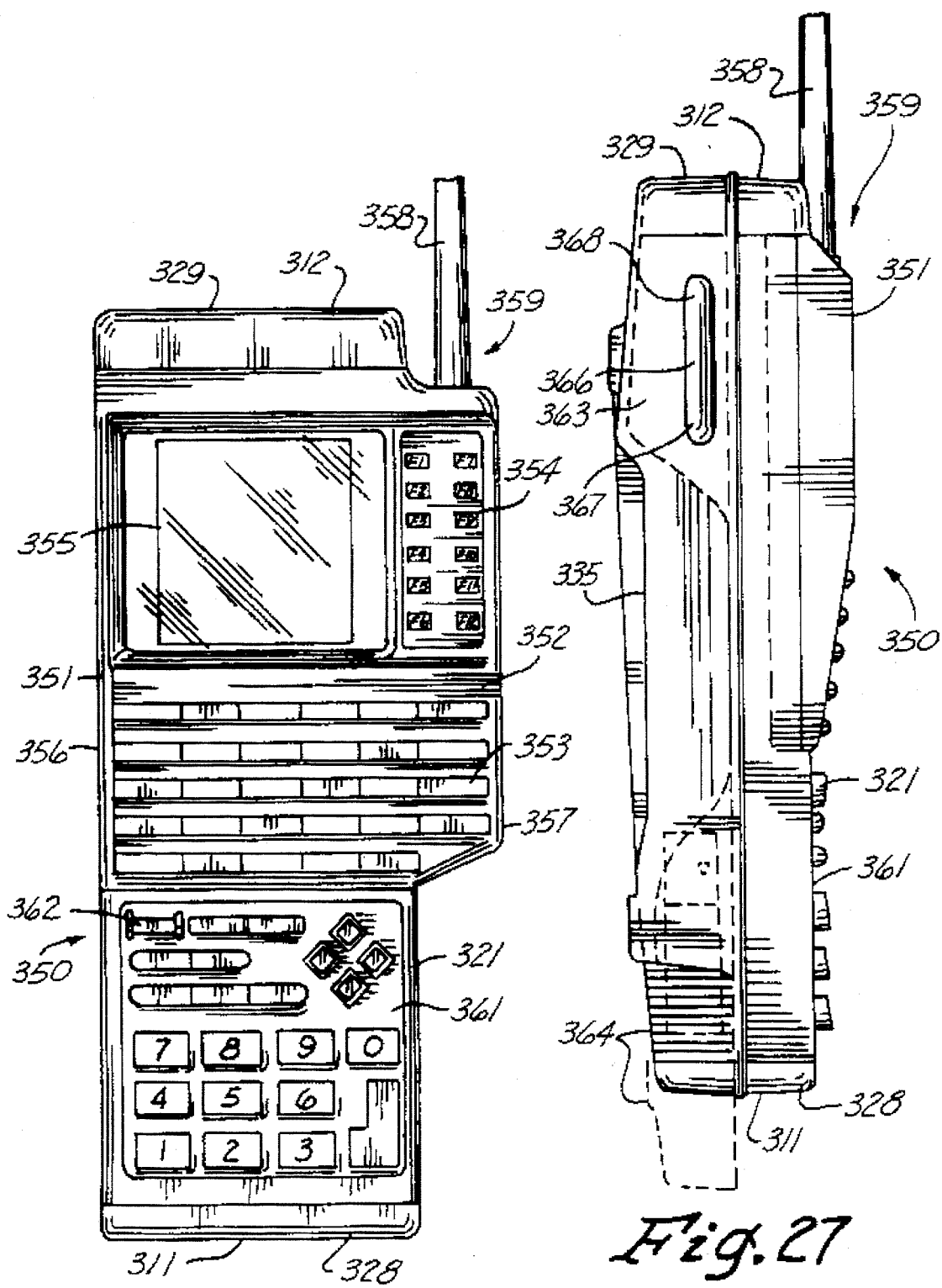

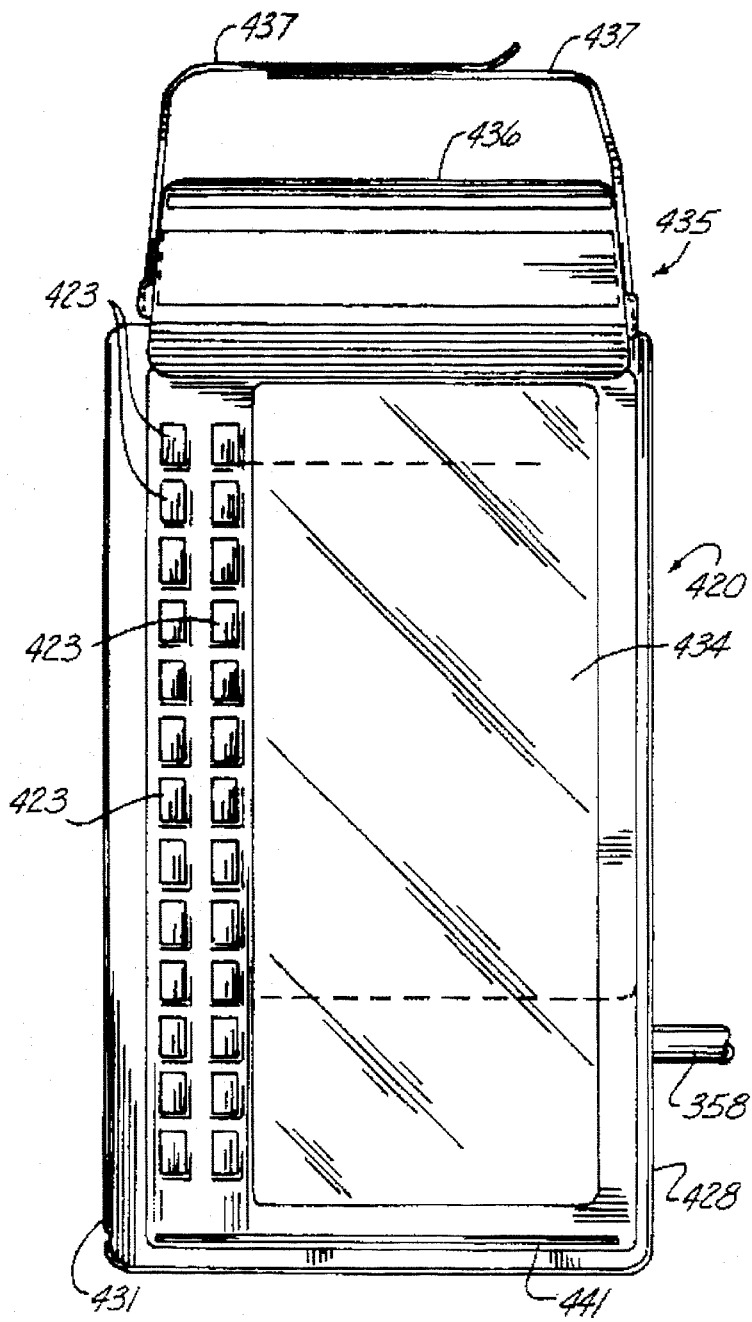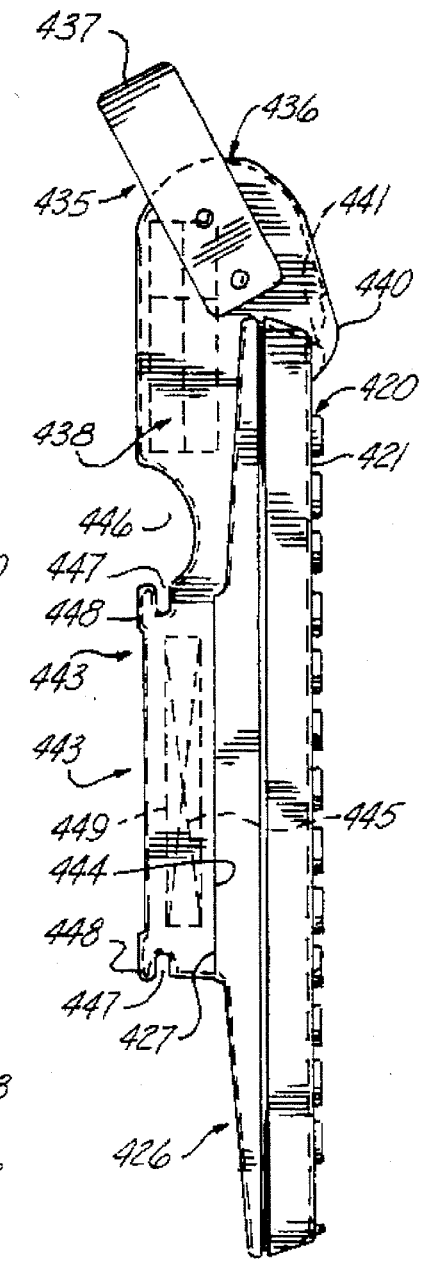

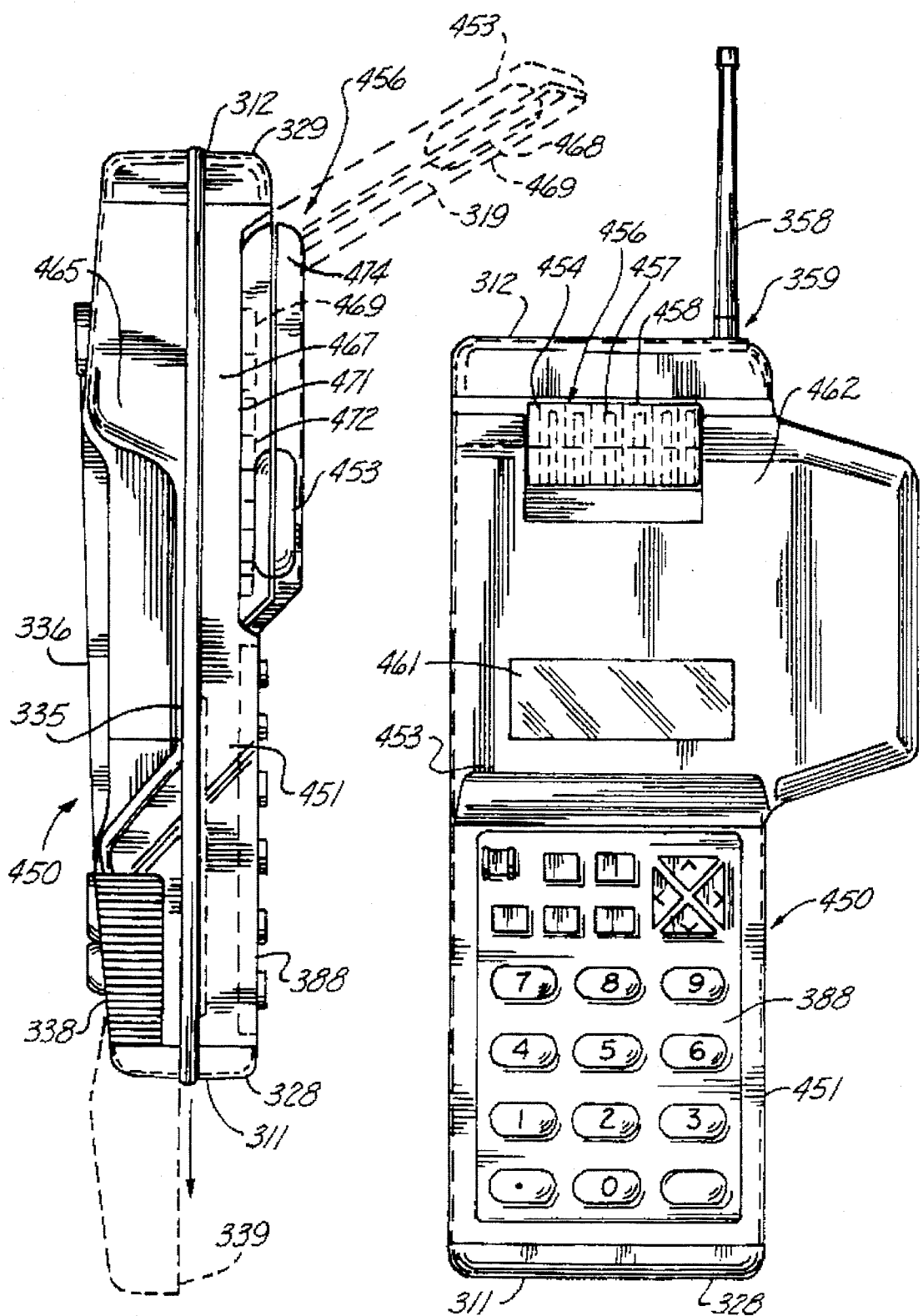

MODULAR HAND-HELD DATA ENTRY SYSTEM

CROSS REFERENCE TO RELATED APPLICATIONS (Claiming Benefit Under 35 U.S.C. 120)

This application is a continuation of application Ser. No. 07/877,324 filed on May 1, 1922, now abandoned, which in turn is a continuation-in-part of application Ser. No. 07/866,642, filed Apr. 3, 1992 by D. Schultz et al, now abandoned. Said application Ser. No. 07/866,642 is in turn a continuation-in-part of the following:

(1) Application Ser. No. 07/816,888 filed Jan. 3, 1992 by D. Schultz et al, now abandoned, which is in turn a continuation-in-part of application Ser. No. 7/809,380, filed Dec. 18, 1991 by D. Schultz et al, now abandoned; and (2) Application Ser. No. 07/633,500, filed Dec. 26, 1990 by S. Koenck et al, now U.S. Pat. No. 5,202,817 issued Apr. 13, 1993, which is in turn a continuation-in-part of application Ser. No. 07/626,711, filed Dec. 12, 1990, now abandoned, which is a continuation-in-part of application Ser. No. 07/364,594, filed Jun. 7, 1989 by K. Cargin et al, now abandoned, and application Ser. No. 07/364,902, filed Jun. 8, 1989 by A. Danielson et al, now abandoned.

The present application is also a continuation-in-part of application Ser. No. 07/777,393 filed Jan. 7, 1992, now U.S. Pat. No. 5,410,141 issued Apr. 25, 1995, which in turn is the U.S.A. national phase of International Application No. PCT/US90/03282 with an international filing date of Jun. 7, 1990; said International Application No. PCT/US90/03282 is a continuation-in-part of said application Ser. No. 07/364,902 filed Jun. 8, 1989, abandoned and said application Ser. No. 07/364,594 filed Jun. 7, 1989, abandoned.

The above referred to related applications, together with PCT Application PCT/US90/03282, filed Jun. 7, 1990 and PCT Application PCT/US91/09421, filed Dec. 12, 1991 are incorporated herein by reference in their entirety, and hereby are made a part of this application.

TECHNICAL FIELD

The present invention relates generally to a hand held data entry terminal, and more particularly to such a terminal which is modular and which has unique mechanisms for attaching or disconnecting modules such as a battery pack or a scanner to the body of such device.

BACKGROUND ART

Hand held data entry terminals are available to collect data, to selectively process data and to communicate collective data with other systems by various automated or manual operations. A typical automated process, which may be included in such operations, relates to collecting data by scanning bar code data with a scanner. Subsequently, the collective data information may be processed such as becoming included in a data base. In another operation, it may be desired to communicate the information to another unit within a respective data collection system.

Various investigatory efforts in this area have shown that some functional applications of the data collection systems may require certain features on such hand-held units which may not at all be required in other functional applications. Going toward specialization of the units for specific tasks, the cost of operating the data collection systems tends to become more and more prohibitive as systems become configured to accommodate various specific applications. On the other hand, when data entry units are mass produced for general applications, efficiency in the application is jeopardized and compromise on various features results in less than the most efficient data handling procedures. It is consequently desirable to provide a data collection system in which hand-held units are equipped with features relating to particular needs without having a prohibitively high price tag.

The desirability of using interchangeable modules in a hand held data entry terminal is illustrated in U.S. patent application Ser. No. 07/633,500, filed Dec. 26, 1990, and U.S. patent application Ser. No. 07/816,888, filed Jan. 3, 1992, both of which are incorporated herein by reference. For example, in addition to having a scanner which can connect to a data entry terminal, other modules can be substituted for such scanners, such as an RF link.

Since these accessories must be sealed to the body housing and secured from moving with respect to the second body housing, prior art systems have been somewhat cumbersome and not altogether reliable.

Another problem associated with hand held data entry terminals is replacement of a battery pack and making sure that the battery pack makes a reliable contact with the contacts within the hand held unit itself.

Because these hand held data entry terminals are often used outside and in wet and inclement weather, it is necessary that it be sealed sufficiently to prevent the entry of moisture therein. The attempts to seal these units on the keyboard portion have not been completely satisfactory and the sealing of an accessory module such as a scanner has been even more of a problem.

Another problem associated with a hand held data entry apparatus is being able to position a scanner attached thereto in such a manner that it is flexible enough to accommodate all users and most working situations. Heretofore, a hand held unit has not been available to permit scan left, right or straight ahead (all three options) while viewing a display on such hand held unit. Also, pivoting the built in scanner or bar code reader about two perpendicular axes has not been considered as a way to provide desired adjustability.

Another problem has been that the audio signal, signaling the situation that the scan has been acceptable, is not always heard because of other noises in the area. Consequently, there is a need for both an audio and visual indication of a "good scan" situation and furthermore, there is a need for a visual indication of a "bad scan." Because the size of the keyboard of a hand held unit must be kept to a minimum, there is quite often not enough space to put all such features available on such keyboard.

DISCLOSURE OF THE INVENTION

The present invention relates generally to a hand held data entry apparatus having a body for receiving, storing and transmitting information, including a camming mechanism for quickly, sealingly attaching an accessory such as a scanner to the top of a hand held data entry apparatus. Additionally, a similar camming mechanism is utilized to hold a battery pack in place with the additional feature of not only pulling the battery pack securely against the housing, but also pushing the battery pack contacts into abutment with complementary contacts disposed within the housing.

A keypad is provided for permitting information to be manually entered into the hand held body and this keypad is encased in a layer of elastomeric material such as silicone. A pair of LED's are utilized, one to indicate a "good scan" and the other to indicate something else, for example a "bad scan." Additionally, these LED's can be encased in operative or dummy keys in order to save keyboard space.

A built in bar code reader is pivotally attached about two perpendicular axis for adjusting the reader for convenience to the user.

An object of the present invention is to provide a mechanism for quickly and dependably securing an accessory such as a scanner to a hand held data terminal.

Another object of the present invention is to securely and dependably attach a battery pack to a hand held data terminal in such a way that the battery pack makes good electrical contact with the hand held data terminal.

Another object of the present invention is to provide a hand held data terminal which is substantially moisture resistant.

A still further object of the present invention is to provide a hand held data terminal which has at least a pair of visual LED indicators to indicate the currents of certain events such as a "good scan," a "bad scan," an indication of a low battery condition, an indication of information from a host computer, and an indication of error in the manual entry of data or anyone of a number of other user programmable events.

A still further object of the present invention is to permit compactness of the keyboard by putting an LED indicator light within keys of the keyboard of a hand held computer data terminal.

A still further object is to provide a bar code reader scanner pivotable about the longitudinal axis of the terminal.

A still further object of the invention is to provide a scanner pivotable about two perpendicular axis with respect to the terminal.

Other objects, advantages, and novel features of the present invention will become apparent from the following detailed description of the invention when considered in conjunction with the accompanying drawings.

BRIEF DESCRIPTION OF THE DRAWINGS

FIG. 1 is a perspective view of a preferred embodiment of the present invention showing a hand held data entry terminal having a keyboard for the entry of manual information, a display, a scanner, a battery pack and an RF link;

FIG. 2 is a side elevational view of the terminal shown in FIG. 1;

FIG. 3 is a rear view of the terminal shown in FIG. 1;

FIG. 4 is an enlarged view of the battery pack taken along line 4—4 of FIG. 1;

FIG. 5 shows the battery pack installed in the body and showing in solid lines how the cams lock the battery pack in place and in dashed lines where the cam followers are before they are pivoted to the solid line position;

FIG. 6 is an enlarged cross sectional view taken along line 6—6 of FIG. 5;

FIG. 26 is a frontal view of an alternate embodiment of a data collection terminal unit such as shown in FIG. 23, the alternate embodiment showing additional features including an RF communications capability as indicated by an antenna extending laterally of the longitudinal body of the data collection terminal unit;

FIG. 27 is a side view of the data collection terminal unit shown in FIG. 26.

FIG. 38 is a frontal view of the display screen module of FIG. 37 in combination with a handle and power supply module;

FIG. 39 is a side view of the display screen and handle and power supply modules of FIG. 38;

FIG. 40 is a frontal view of a data collection terminal unit shown in alternate embodiment of a keyboard module in combination with a display screen;

FIG. 41 is a side view of the data collection terminal unit shown in FIG. 40;

BEST MODE FOR CARRYING OUT THE INVENTION

DESCRIPTION OF FIGS. 1–22

Figure 7:
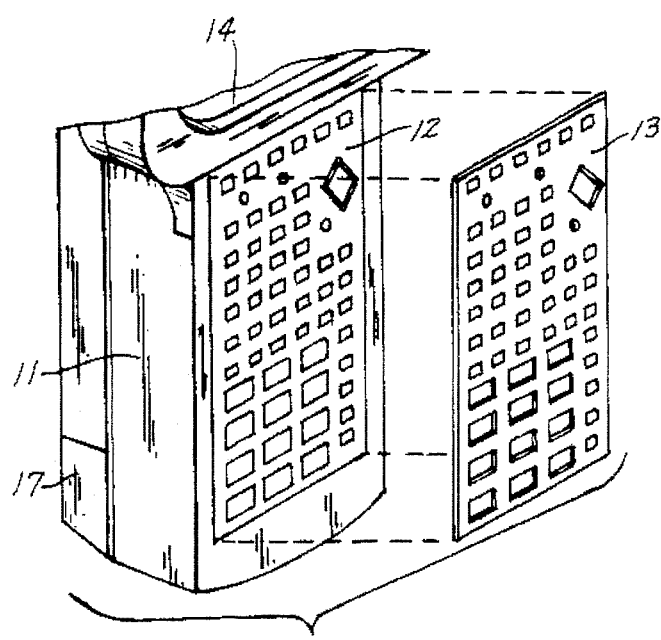
FIG. 7 is an exploded view of the keypad showing an overlay for providing written information to the user.
Figure 8:
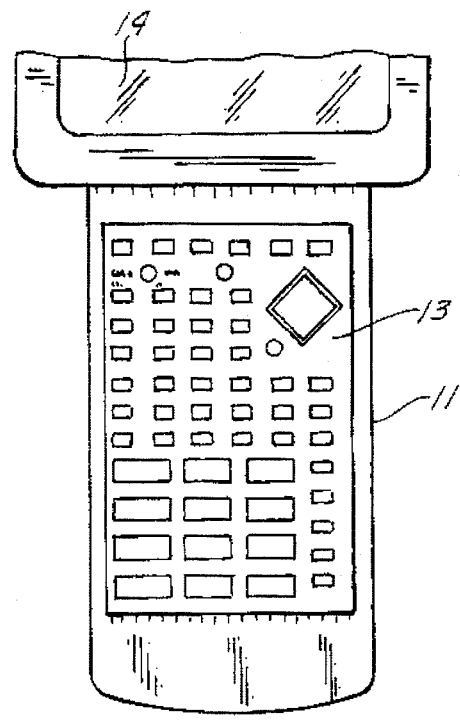
FIG. 8 is a front view of the device of FIG. 7 with the overlay attached.

Referring now to the drawings wherein like reference numerals designate identical or corresponding parts throughout the several views, FIG. 1 shows a hand held data entry terminal (10) constructed in accordance with the present invention and having a body (11). A keyboard (12) has an overlay (13) disposed thereon and a display (14) is provided for displaying whatever is manually entered through the keyboard (12) or what is scanned in through scanner (15). The scanner (15) also has an RF link (16) attached thereto.

Battery pack (17) fits in the bottom of the body (11) for providing power to the terminal (10). Side button (18) is provided for shifting the definition of certain keys on the keyboard to another definition by merely using the hand holding the housing (11). The battery pack (17) has a plurality of metal contacts (19) thereon for engaging a plurality of contacts (20) inside the housing (11) as is shown in dashed lines in FIG. 2.

Figure 17:
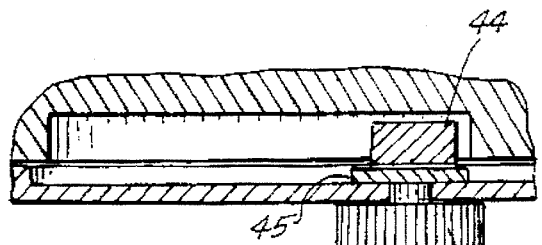
FIG. 17 is an enlarged partial view taken along line 17—17 of FIG. 13 showing the camming slots and cam follower.
Figure 18:
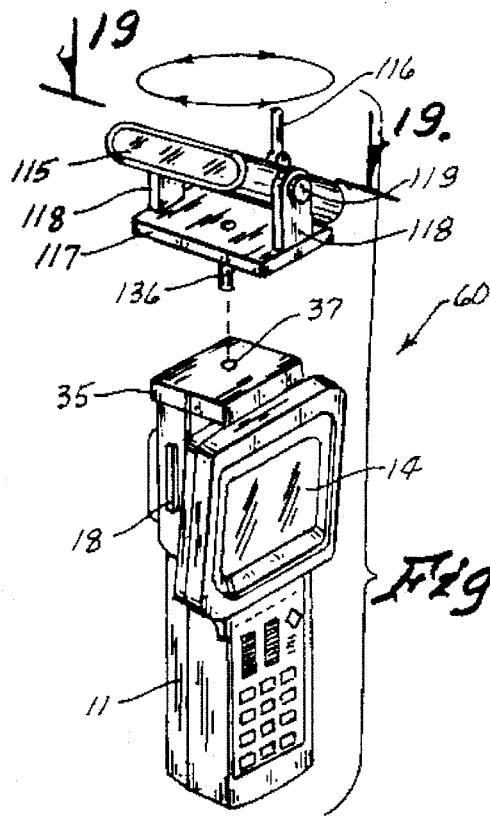
FIG. 18 is an exploded perspective view of another embodiment of the present invention showing a scanner or bar code reader which is pivotable about an axis perpendicular to the longitudinal axis about which the scanner is also rotatable.
Figure 19:
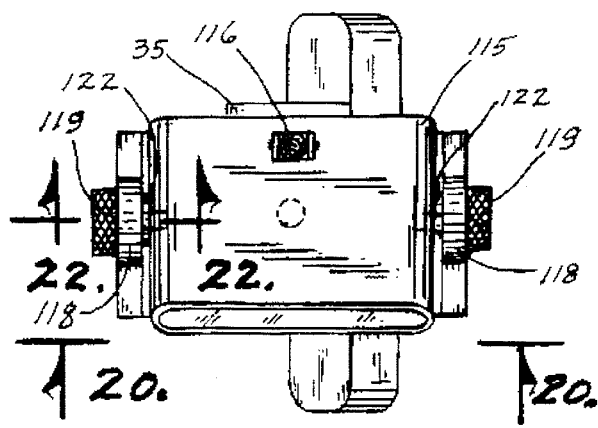
FIG. 19 is a view taken along line 19—19 of FIG. 18.
Figure 20:
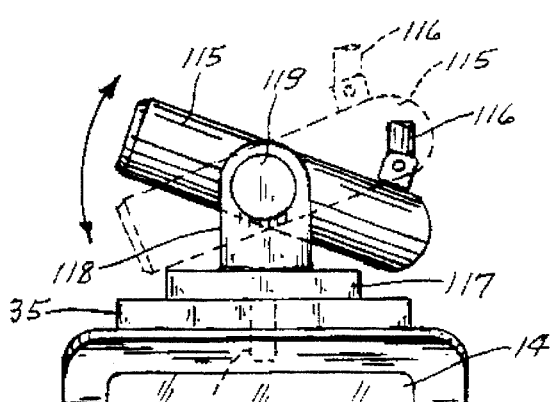
FIG. 20 is an enlarged view taken along line 20—20 of FIG. 19.
Figure 21:
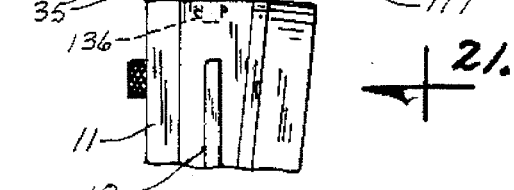
FIG. 21 is an enlarged view taken along line 21—21 of FIG. 20 showing how the scanner can be adjusted about a horizontal axis.
Figure 22:
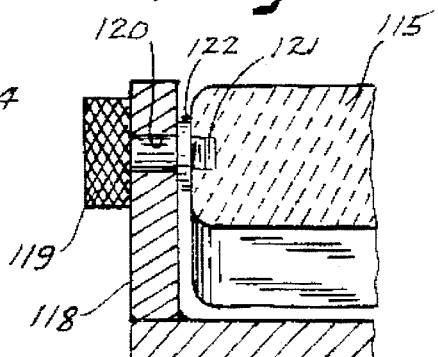
FIG. 22 is an enlarged cross-sectional view taken along line 22—22 of FIG. 19 showing how set screws at the sides of the scanner can be used to permit pivoting of the scanner and at the same time can be used as a locking mechanism to hold the scanner in place after it is adjusted about a horizontal axis.

In order to secure the battery pack (17) into the housing (11) in the position shown in FIGS. 2 and 3, the knob (21) is utilized to position member (23) and cams (24) to the position shown in dashed lines in FIG. 5. In that position, the battery pack (17) can be slid into the housing (11) and the cam followers (24) will slide along the straight portion (26) and (27) of the slots therein. After the battery pack (17) is moved to the position shown in FIG. 5, the knob (21) is rotated so that the cam followers (24) move in curved slot portions (28) and (29). This will have the effect of pulling the battery pack (17) in the direction of the arrow shown in FIG. 17 to pull the shoulder (30) of battery pack (17) against shoulder (31) of the housing (11). Additionally, because of the extra cam piece (32) disposed within each of the grooves (28) and (29), the cam follower (24) will push on the battery pack (17) to cause it to move in the direction shown in the arrow in FIG. 6, which will force the contacts (19) securely against the contacts (20) within the housing (11) as shown in FIG. 2 in dashed lines.

Referring now to FIGS. 11–17, it is noted that the scanner (15) is rotatably attached to a member (35) by a post (36) extending through an opening (37) in member (35) whereupon a pin (not shown) extends through a hole (38) to prevent the post (36) from pulling back up through the hole (37) in member (35). A flange (39) is rigidly connected to the member (35) and has grooves with straight portions (40) and (41) and curved portions (42) and (43) respectively.

Cams (44) are rigidly connected to a member (45), which turns in the same direction as knob (48) is turned and to the same degree that knob (48) is turned in one direction or the other. These cams (44) are initially moved to the open position shown in dashed lines in FIG. 13 so that the straight portions (40) and (41) of flange (39) will receive these cam followers (44) so that the flange (39) can be moved to the position shown in FIG. 13. By turning the knob (48) in a clockwise direction, the cam followers (44) will move to the position shown in FIG. 13, thereby pulling the flange (39) in the direction shown by the arrows in FIG. 13 such that an O-ring seal (46) is pulled down against the shoulder (47) at the top of the housing (11) to securely seal the member (35) against the housing (11).

Figures 14, 15:
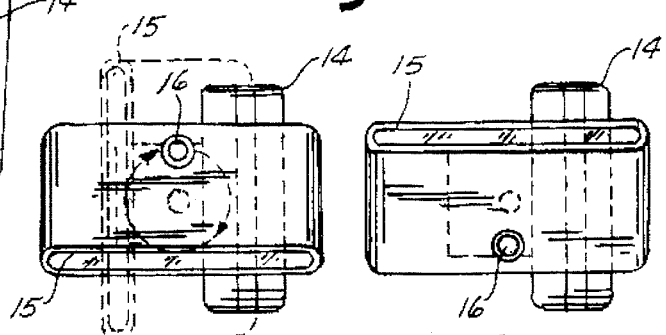
FIG. 14 is a view showing the scanner pivoted to the left when a person is viewing the display and is a top plan view.
FIG. 15 is a top view showing the scanner facing to the right as a user is viewing the display.
Figure 13:
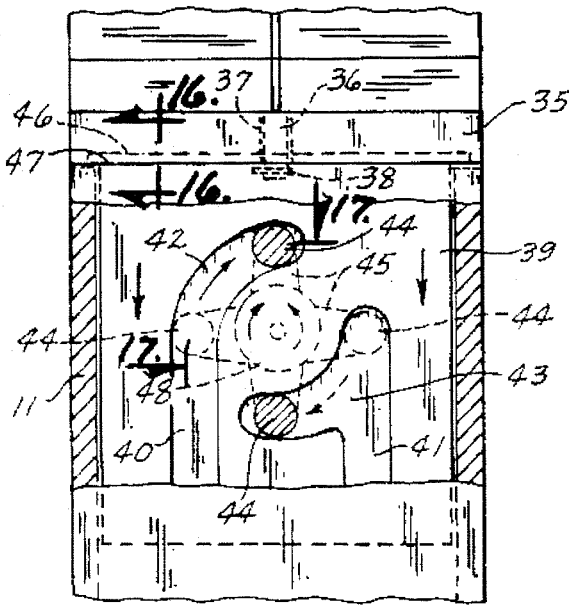
FIG. 13 shows a broken away view of the scanner attached to the terminal and showing the cam followers in solid lines in the attached position and in dashed lines in the position just prior to rotation of the cam followers.
Figure 16:
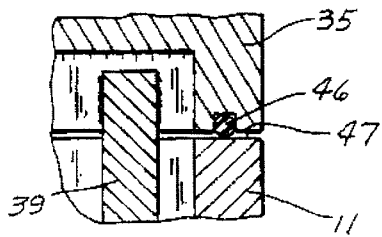
FIG. 16 is an enlarged partial cross sectional view taken along line 16—16 and showing how the connecting structure seals the scanner to the body of the terminal by use of an O-ring.

Because the scanner (15) is pivotable about the post (36), and member (35), it can be moved to the left as shown in FIG. 14 and the scanning function can occur while the user is holding the device and looking at the display (14). Similarly, the user can move the scanner (15) to the right while viewing the display (14), or alternatively, the user can orient the scanner (15) to the position wherein it points generally in the direction that the user is looking when looking at the display (14). The is permits the user to view the display while at the same time scanning information into the terminal.

Figure 10:
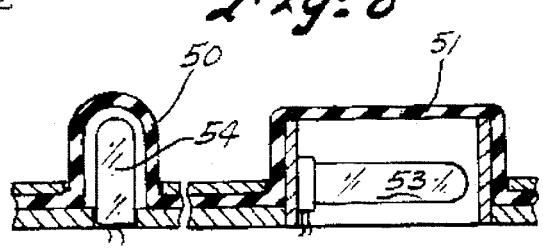
FIG. 10 is an enlarged partial cross sectional view taken along 10—10 of FIG. 9.
Figure 11:
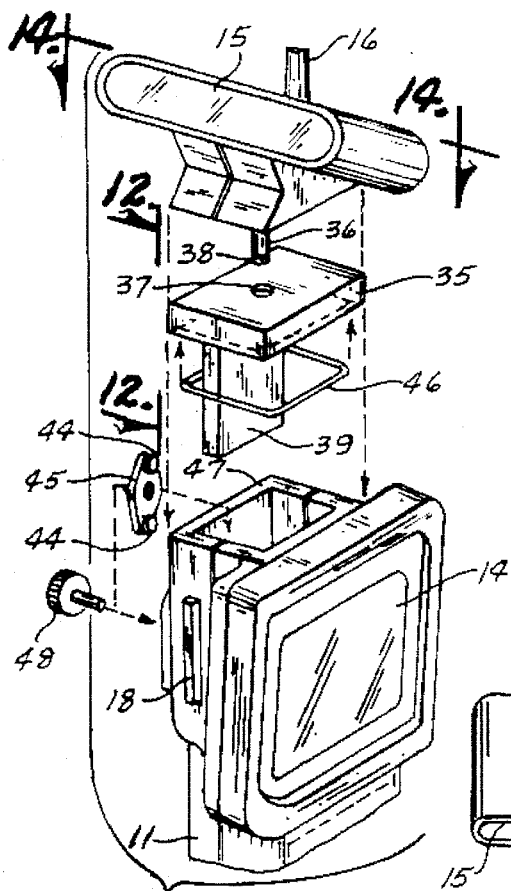
FIG. 11 is an exploded view showing how the scanner is attached in a modular fashion to the top of the terminal with the cam locking mechanism and also showing the structure being impossible to pivot the scanner 180°.
Figure 12:
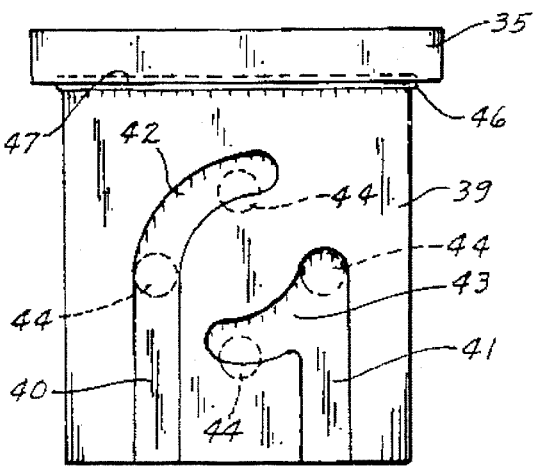
FIG. 12 is a view of a portion of the structure shown in FIG. 11 taken along line 12—12 of FIG. 11.

FIG. 10 shows how the entire keyboard (12) is encased in an elastomeric silicone-like substance (50) which covers all of the keys including, a green key (51) for indicating a good scan and a yellow translucent key (52) for indicating a bad scan or the like. The elastomeric material (50) is translucent and permits light from an LED (53) to shine therethrough. Similarly, a separate pair of LED's (54) can extend through elastomeric portions (55) and (56). Ideally, the LED's (53) and (54) are mounted on the PC board keypad and the silicone elastomer is molded over the keys and over the LED's.

Figure 9:
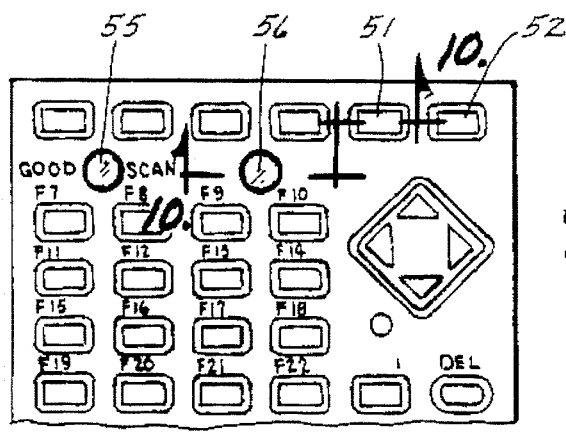
FIG. 9 is an enlarged partial view of the top portion of the overlay attached to the hand held data entry terminal.

The overlay (13), as can be seen in FIG. 9, has the words "good scan" beside it to indicate when the scan has been adequate and such condition would light the LED (54) in addition to the typical audio indication of a good scan. The other light indicating source (56) is user programmable and is also typically supplemental to an audible signal or it can replace an audible signal, if desired. This other visual indicator (56) can flash with each proper keystroke for manual entry of material into the terminal (10), it can flash to indicate a low battery condition, it can glow to indicate that information from a host computer is being received, it can indicate an error in the manual entry of data, it can merely indicate a scan which is bad or unacceptable, etc., depending upon the function programmed into the terminal (10).

Referring to FIGS. 18–22, a terminal (60) is shown. The terminal (60) is just like the terminal (10) shown in FIG. 1 from member (35) down and the portions numbered in the 100 series constitutes the different part of the terminal (60). Specifically, a CCD reader or laser scanner (115) is pivotally attached to member (117) by upstanding flanges (118). These flanges (118) (referring to FIG. 22) are rigidly attached to the member (117) and have openings therein for receiving set screws (119). These set screws (119) rotate freely within opening (120) of flange (118) and have threads (121) on the end thereof which are threadably received into the body of scanner (115). A washer (122) is provided between each flange (118) and the scanner body (115) for reasons which will be explained below.

Shaft (136) fits into the opening (137) of member (35) and can be pinned in placed as explained above with respect to the FIG. 1 embodiment. This permits the entire scanner unit (115) and member (117) to pivot about the axis of shaft (136) and consequently about the horizontal axis of the terminal body (11) as explained above and for the reasons given above with respect to the terminal (10). Additionally, the scanner (115) will pivot about the axis of set screws (119) and be movable generally between the positions shown in solid lines in FIG. 21 and the position shown in dashed lines in FIG. 21. It has been determined that some users prefer to hold the terminal in a different scanning position than others and that particular circumstances may dictate that a pivoted position between the two positions shown in FIG. 1 may be ideally suited for one circumstance while another pivoted position may be ideal for still another circumstance.

The set screws (119) are loosened in order to permit the scanner (115) to pivot freely about the axis of the set screws (119) and once the scanner is pivoted to the position desired, the set screws (119) are tightened, thereby pulling the scanner (115) against the washers (122) thereby frictionally preventing the scanner (115) from pivoting with respect to the flanges (118).

Of course when it is desired to re-adjust the scanner, a reverse process is used wherein the set screws (119) are loosened, the scanner or bar code reader (115) pivoted to the desired position and the set screws again tightened to hold it in the desired position.

DESCRIPTION OF FIGS. 23–43

In accordance with the present invention, a selected one of a plurality of special purpose functional modules may be attached to another module of one of a selected second functional configurations to configure a plurality of different modules of different specific functional features. Thus, according to one aspect of the invention, with a reasonable number of functional modules a great number of differently configured modules may be provided.

A hand-held data collection terminal unit includes an elongate housing having a lower portion supportable in the hand of a user and an upper portion facing such user when the terminal is in a typical use position. The upper portion includes a keyboard and a display screen. In accordance with the invention, the hand-held terminal comprises a plurality of modules in which a base module extends longitudinally and includes inner and outer end caps of the terminal. The inner end cap is disposed on the end of the terminal which typically points toward a user when the terminal is in use, the outer end cap being disposed on opposite end of the terminal. A keyboard module is defined as an intermediate module disposed adjacent the base module and between the end caps. A display screen module is further disposed adjacent the intermediate module and adjacent the outer end cap of the base module.

According to a more particular aspect of the invention, the display screen module extends from the outer end cap at the base module longitudinally toward an end intermediate of the inner and outer end caps, such that a portion of the keyboard module remains exposed and features an array of manual input keys arranged in an area between the display screen module and the inner end cap.

According to another aspect of the invention, a data collection terminal unit includes a base module, a keyboard module disposed ad adjacent the base module and substantially of the same length and width as the base module. A display screen module is disposed adjacent the keyboard module and is disposed over at least one key arrangement of the keyboard unit. The display screen module is slidably arranged to be selectively slidable outward away from a user and from such at least one key arrangement to expose such keys for user access when the terminal unit is being placed into use.

According to yet another aspect of the invention, it is desired to protect the modular hand-held units from damage when the units are accidentally dropped. Resilient end caps and a layered, resilient interface extending peripherally beyond substantial module portions impart shock absorbing qualities to the modular hand-held units.

According to a further aspect of the invention, a scanner module is attached as an end cap module to an outer end of a modular hand-held terminal unit. The scanner module includes a scanner head which is rotatable about a longitudinal axis of the modular hand-held terminal unit and selectively adjustable to one of a plurality of user positions in which the scanner may conveniently be used to collect data from, for example, bar code labels while a display screen on a display screen module remains in view of the user of the terminal unit.

In further describing the various features and advantages of the invention and of particular hand-held terminal units including and embodying features of the invention, the following spacial relations are being followed. Directional indications refer to a normal position of use of a hand-held data collection terminal. In such position, the user would hold the terminal or terminal unit such that a display screen faces "up" into the direction of view of the user. Similarly, a keyboard would normally face up to e visible and manually accessible to a user. Correspondingly, the upper face of a data collection terminal unit is also referred to as a frontal side or face. The opposite side or portion of the unit is referred to as the rear or bottom portion of the unit and the direction in which the rear portion faces is the "lower, bottom or down" direction, or term of similar import. Also of interest are the descriptors at opposite ends of a longitudinal axis through a terminal unit. With the keyboard and display screen facing up, the longitudinal end of the terminal unit typically facing away from the user will be referred to and denoted as an "outer" end, while an opposite end of the unit directed toward the user when the unit is in a general position as described, is referred to as an "inner" end. These references should be kept in mind when reading the following detailed description.

Figure 23:
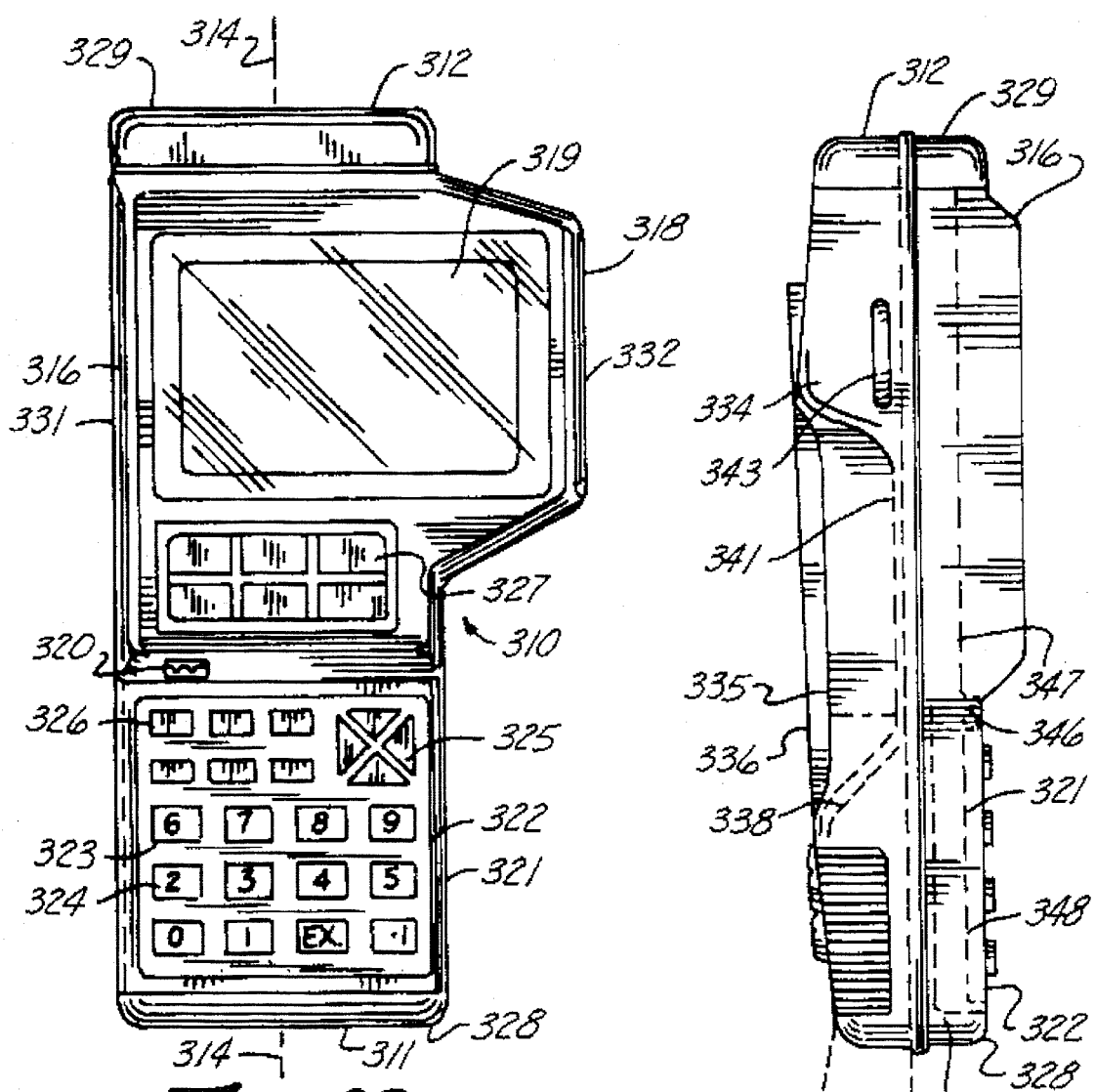
FIG. 23 shows a frontal view of a modular data collection terminal unit having a display screen module which is enlarged to one side of a generally elongated shape of the terminal unit.

Referring to the various illustrations in sequence, a data collection terminal unit which is designated generally in FIG. 23 by the numeral (310), is shown as undergoing various changes and modifications as selected different modules may be substituted for other modules and functions and capabilities of the data collection terminal unit (310) are correspondingly altered.

In reference to FIG. 23, there is shown a frontal view of the data collection terminal unit (310). In furtherance of advantages and objects of the invention, the data collection terminal unit (310) is a modular unit in that a plurality of modules become attached to each other to form the terminal unit (310). A general shape of the terminal unit (310) is an elongate rectangular shape as can be ascertained from the drawing. The terminal unit has an inner end (311) which typically is closest to a person using the terminal unit (310) when the terminal unit is in a typical hand-held operating position in which a user exposes a keyboard and a display screen toward the line of sight. Opposite the inner end (311) an outer end (312) of the data collection terminal unit is directed away from a user when the terminal unit (310) is hand-held in a typical use position. The general shape of the terminal unit is that of an elongated rectangle, such that a hypothetical longitudinal centerline or central axis indicated at (314) can be envisioned to extend in the longitudinal inward-outward direction of the terminal unit (310). The frontal view shows a display screen module (316) which is enlarged to one side of the terminal unit (310). A lateral extension (318) of the display screen module is in the preferred embodiment shown to extend toward the right hand side of the central axis (314) beyond the generally elongate rectangular shape of the terminal unit (310). The direction may be one of convenience to a user. The lateral extension, whether toward the left or right of the longitudinal axis (314) extends the line width of the viewing area of a display screen (319) of the module (316). Such extension (318) is desired to permit an alphanumeric instruction to be contained within a single character line of display for example. The display screen module (316) further may include a main power switch (320), in that in various configurations of the terminal unit (310) a display screen module or its equivalent would be included. Below the display screen module (316), and inwardly disposed, lies a keyboard module (321). The keyboard module (321) includes a particular keyboard (322) which may typically include an arrangement (323) of numerical keys (324). The numerical keys (324) are desirably supplemented by a cluster of cursor keys (325) and by selected function keys (326). The display screen module (316) may also include a cluster of further function switches (327). It should be understood that the modules (316) and (324) are mechanically attached to and part of the terminal unit (310) and are further electrically interconnected, such as may conveniently be achieved by typical flat cables and respective connectors, not shown. It is therefore convenient to provide cursor movement keys, such as the keys (325) as part of the keyboard, in that it is typically intended for the terminal unit (310) to feature a display screen module.

Further in accordance with the invention, the terminal unit (310), the unit being typically hand-held, is subject to accidentally being dropped. To protect the terminal unit (310) from damages when dropped and established height, resilient end caps (328) and (329) cover the inner end outer ends (311) and (312), respectively. In addition, it has been found desirable to protect lateral ends of the display screen module (316) similarly with resilient strips (331) and (332).

Figure 24:
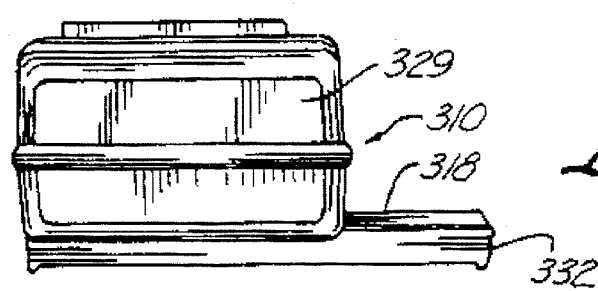
FIG. 24 is a side view of the data collection terminal unit shown in FIG. 23.

FIG. 24 is a side view of the data collection terminal unit (310). The side view of the terminal unit (310) further illustrates the modular construction of the terminal unit (310). A base module (334) desirably includes a central handgrip portion (335) and may further include a resilient strap (336), such that a user may insert the hand between the handgrip portion (335) and may further include a resilient strap (336), such that a user may insert the hand between the handgrip portion (335) and the resilient strap. A battery compartment (338) is shown at the lower, inner end of the base module (334). In that the terminal unit is a hand-held unit, an internally disposed electrical power source such as a battery module (339) is virtually required for desired operation of the terminal unit. In one configuration, the battery compartment comprises an opening into which the battery module (339) is inserted. The external shape of the battery module conforms to the shape of the base module to form part of it. The battery module (339) is desirably replaceable in a field exchange operation and may be removed by sliding the module (339) in the direction of the arrow (340). To secure the battery module within the base module (334), a locking mechanism which may be opened and closed by a coin, for example, is found to facilitate such replacement. A peripheral resilient strip or spacer (341) preferably overlies the base module (334) and functions as a shock absorber when the terminal unit (310) is accidentally dropped on its die surfaces. Adjacent the outer end of the handgrip portion (335) is disposed a function key (343). The function key (343) may be a data entry initiation key or a scanner operation control key when the terminal unit is equipped with a scanner module. It should be noted, that the function key (343) is disposed for persons holding the terminal unit in their right hand, such that the index finger of the user's right hand may be used to operate the key (343). The base unit may be furnished with a similar key (343), not shown, on the opposite side of the base module (334) to allow a person holding the unit with the left hand to operate such key. The respective keys would be electrically coupled to function in parallel, such that the desired function can be initiated from either side of the terminal unit (310). Disposed between the resilient end caps (328) and (329) and adjacent the resilient spacer (341) is the keyboard module (321). The keyboard module (321) functions consequently as a mounting base for the display screen module (316). A recess or step (346) in the upward facing surface (347) of the keyboard module (321) seats the display screen module (316). The display screen module (316) is preferably attached by typical screw type fasteners through the keyboard module (321). The keyboard module (321) in turn may be fastened in a similar manner from the bottom surface of the base module (334). In accordance with the invention, the keyboard module (321) further comprises a recess (348) for receiving one of a number of differently configured versions of the keyboard (322). The selected keyboard (322) is also attached through the body of the keyboard module (321) with respective fasteners, such as screws, for example.

Figure 25:
FIG. 25 is an outer end view of the data collection terminal unit shown FIG. 23.

FIG. 25 is an outer end view of the data collection terminal unit (310). The need for the referred to resilient protective strip (332) may be realized in viewing lateral extending portion (318) of the display screen module (316).

FIG. 26 is a frontal view of a data collection terminal unit (350) which is an alternate embodiment of the terminal unit (310). In particular, the terminal unit (350) comprises a display screen module (351) including an arrangement (352) of alphabetical keys (353). The display screen module (351) further includes an arrangement of function keys (354) disposed vertically along a display screen (355). To accommodate the key arrangement (352), the display screen module (351) is also laterally extended as the display screen module (316). Consequently, lateral resilient strips (356) and (357) are preferred to increase the drop resistance of the terminal unit (350) as previously discussed with respect to the terminal unit (310). Because of the area occupied by the keys (352) and the function keys (354), the display screen does not extend beyond the lateral sides of the generally elongate shape other than the extended display screen display module (351). The terminal unit (350) further shows an outwardly extending antenna (358) as part of and evidencing a radio frequency communication system (359) being part of the terminal unit (350). As described with respect to the terminal unit (310), the terminal unit (350) also includes the resilient end caps (328) and (329). A keyboard (361) may be functionally different than the previously described keyboard (322), though it may be fitted into the aforementioned recess (348) of the keyboard module (321). In particular, the keyboard (361) shows a main power switch (362), rather than having such switch associated with the display screen module (351). As can be ascertained from the terminal unit (350), modules such as the keyboard module (321) may be interchangeably used with one of a number of display screen modules, such as the modules (316) and (351).

FIG. 27 is a side view of the data collection terminal unit (350). A base module (363) may in outer dimensions be the same as the base module (334) described with respect to FIG. 24. One difference may be noted in the configuration of a battery module (364) with respect to the configuration of the battery module (339). The battery module (364) shows less external surface and is inserted for a substantial portion into the base module (363). The centra hand grip portion (335) of the base module is in essence identical in both base modules. Another notable difference relates to a laterally disposed outer function key (366) which preferably may include more than one function, such as an enter function and scan function. The function key may be operated to enter data and to operate a scanning module when such a scanning module is provided. To operate the enter function, an inner end (367) of the function key (366) is depressed. To operate the scanning function an outer end (368) may be depressed. The respective, inner and outer locations are assigned because of a preferred addition of a scanner module in lieu of the outer end cap (329). As described with respect to the function key (348), the function key may be provided on either or both sides of the respective base modules. When the function keys are not provided, they may be deleted and replaced by a plug (not shown) which would be installed in lieu of the function switch. Also to be observed is the one for one placement of the display screen module (351) for the previously described display screen module 16 into the keyboard module (321).

Figure 28:
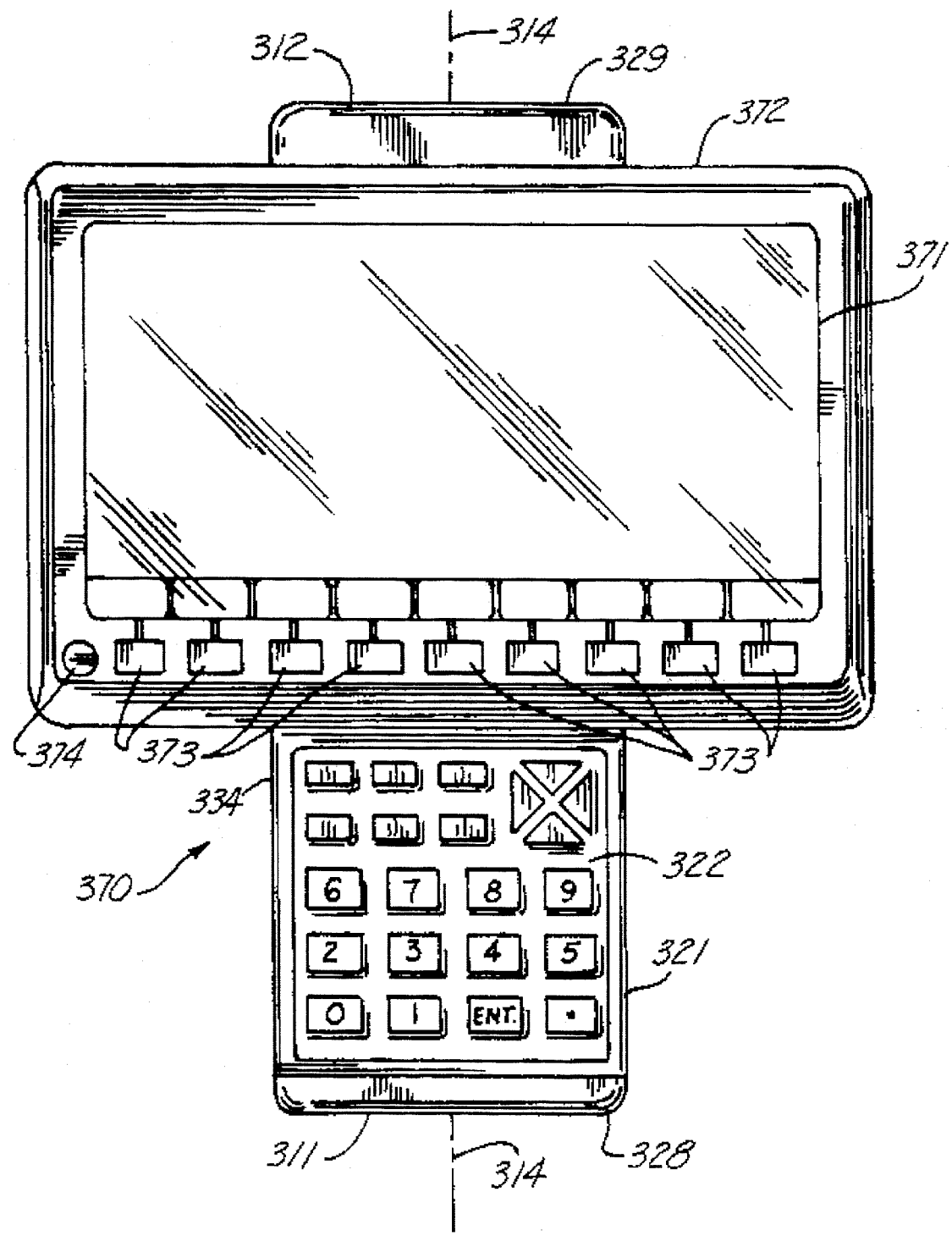
FIG. 28 is a frontal view of yet another embodiment of a data collection terminal unit in accordance with the invention, the terminal unit showing a display screen which extends laterally beyond the basic longitudinal shape of the terminal unit.

FIG. 28 is a frontal view of yet another terminal unit (370), having Uniquely wide screen (371) disposed in a display screen module (372). The display screen module (372) is mounted in the manner described with respect to the display screen module (316) to the keyboard module (321). The display screen module (372) extends to both sides with respect to the central axis (314) of the terminal unit (370) beyond the width of the base module (334) or (366) and the keyboard module (321). The size of the display screen (371) permits only a limited number of function keys (373) which are preferably disposed adjacent the outer edge of the keyboard (322). The display screen module (372) may also include a power switch (374) when such a function is not part of the keyboard module (321) and its respective keyboard (322). It should be realized, however, that without diminishing the width of the display screen (371), the number of display lines thereon may be diminished to include on another display screen module an alphabetical keyboard.

Figure 29:
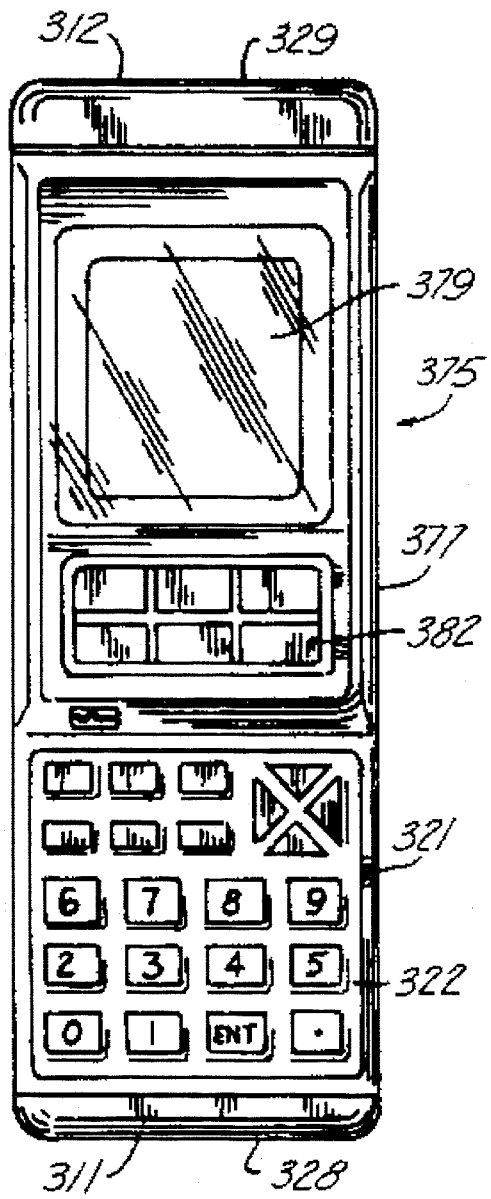
FIG. 29 is a frontal view of a data collection terminal unit similar to the terminal unit shown in FIG. 23, except that a display screen module is shown which is confined to the generally longitudinal shape of the data collection terminal unit.
Figure 30:
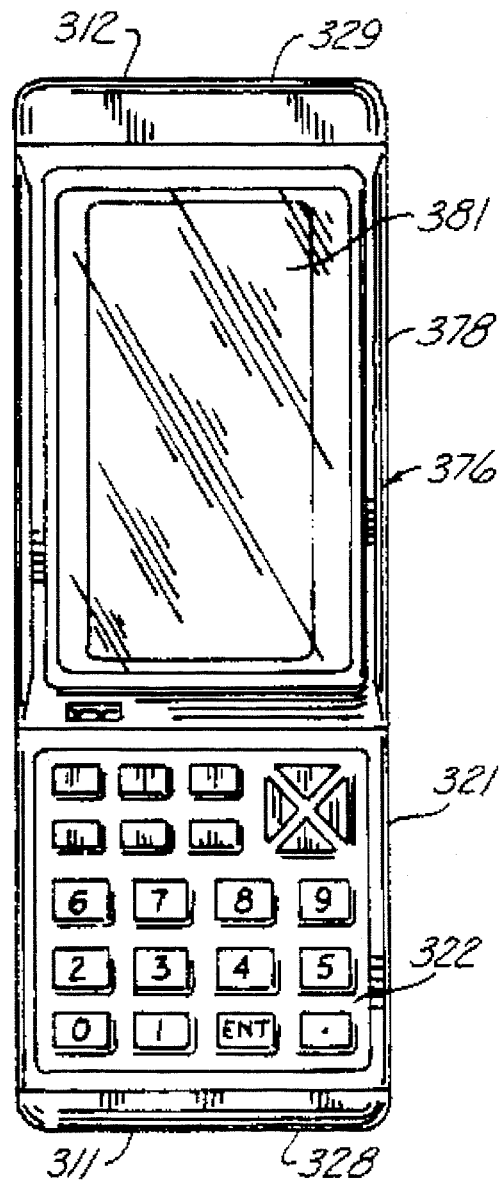
FIG. 30 is a frontal view of another embodiment of a data collection terminal unit in which the display screen module of the terminal unit in FIG. 29 has been replaced by an elongate display screen module in which function or control keys have been eliminated to afford room for added display area of the display screen.

FIGS. 29 and 30 show terminal units (375) and (376), respectively. Both terminal units show display screen modules (377) and (378), respectively, in which respective display screens (379) and (381) are contained within the lateral bounds of the keyboard module (321).

The display screen module (377) includes function keys (382), arranged in an earlier referred to arrangement. In contrast, the display screen module (378) does not include the function keys (382) but is instead in the direction between the inner and outer ends (311) and (312) of the terminal unit (376), hence in the vertical direction of the display screen enlarged. Thus, FIGS. 29 and 30 show further embodiments of the terminal unit that can be provided with only minor modifications in the assembly of the respective units.

Figure 31:
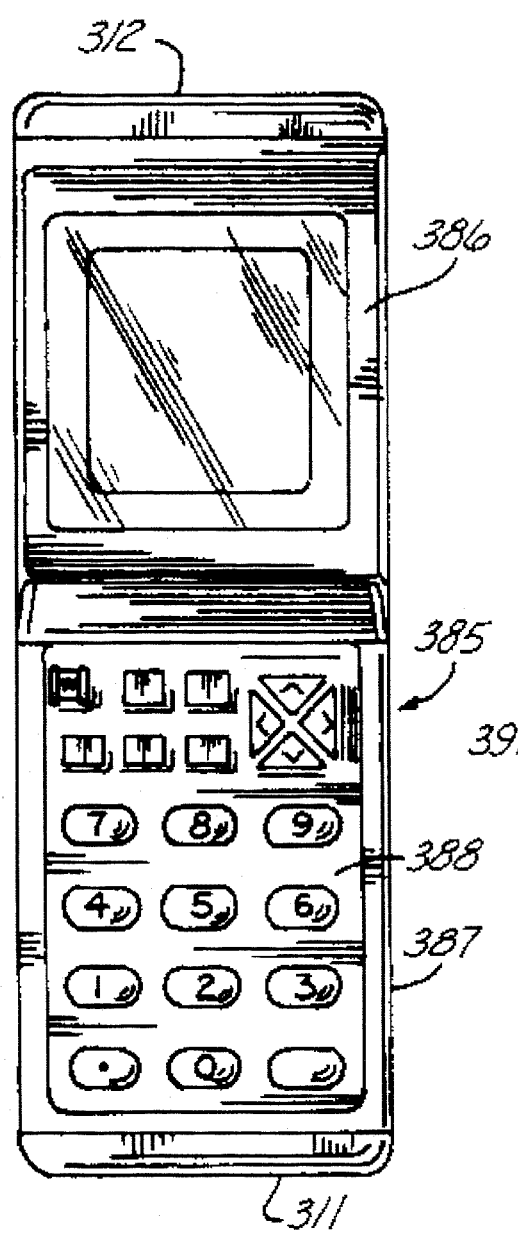
FIG. 31 is a frontal view of a data collection terminal unit showing a first keyboard array adjacent an inner end of the terminal unit and a display screen module adjacent an outer end of the terminal.
Figure 32:
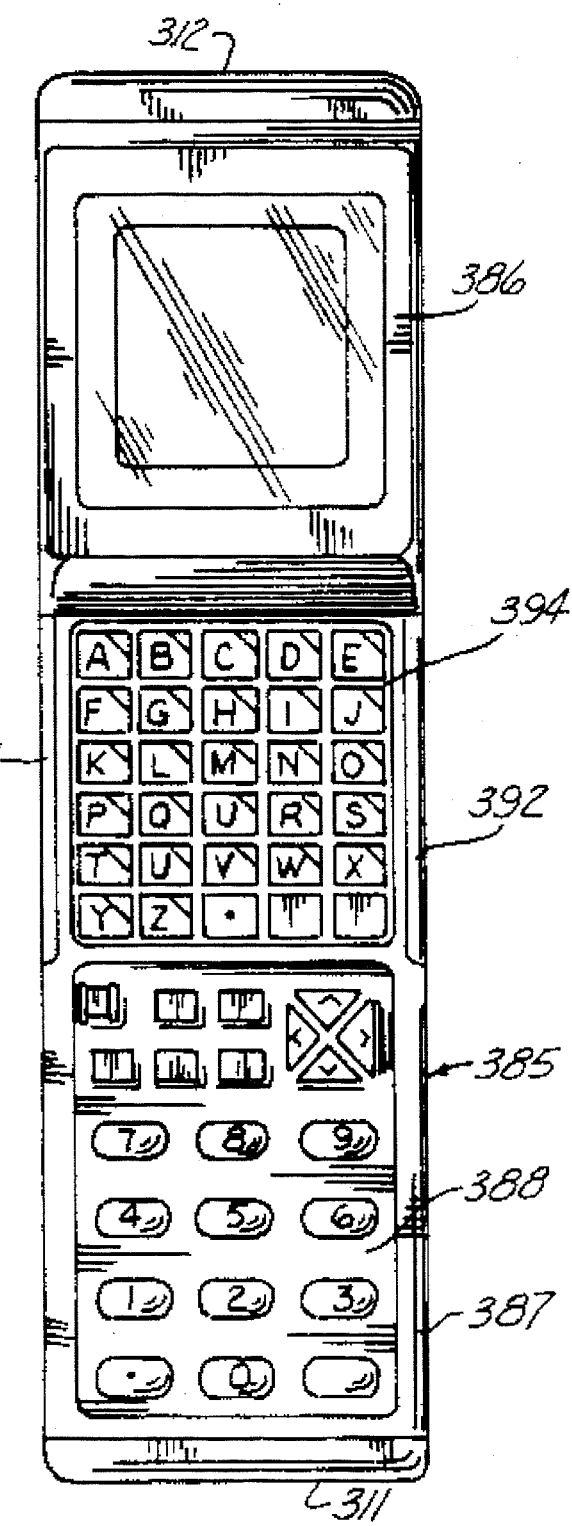
FIG 32 is a frontal view of the data collection terminal unit shown in FIG. 31, in which the display screen module has been extended outwardly away from the user to uncover a second keyboard array which is in the non-extended position of the display screen module disposed beneath such module.

FIG. 31 is a frontal view of a data collection terminal unit (385) which features a variation of the described keyboard and display screen modules. The terminal Unit (385) includes a display screen module (386) and a keyboard module (387). As in the previously described terminal unit, the keyboard module (387) extends substantially between the inner and outer ends (311) and (312) of the terminal unit (385). A first keyboard (388) is mounted into an innermost end of the keyboard module (387). However, the display screen module (386) is outwardly slidably mounted to slide from an innermost position as shown in FIG. 31 to an outermost position shown in FIG. 32. Sliding motion is supported by rails (391) and (392) disposed along opposite sides of the terminal unit (385). In the outermost position of the display screen module (386), a second keyboard (394) is uncovered, in that the second keyboard is located directly adjacent the innermost position of the display screen module (386). The second keyboard (394) may be received by the keyboard module (387) in a recess similar to the keyboard (388). The first and second keyboards may be of different heights between inner and outer ends, or the keyboards may be configured to be of equal height. In such a configuration, the keyboard module may be provided with proper recesses which are of the same size. In the described embodiment, the first keyboard has a greater vertical height than the second keyboard, and respectively differently sized cavities for receiving the first and second keyboards (388) and (394) are provided. The differences in size may prevent an inadvertent switching of the respective keyboards (388) and (394) during assembly of the terminal unit (385).

Figure 33:
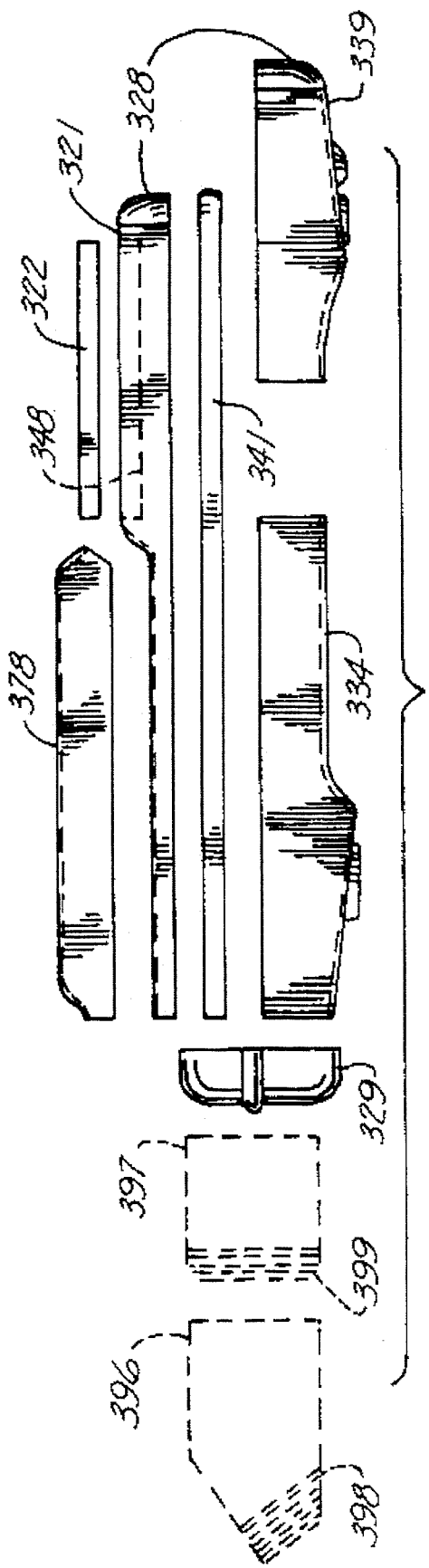
FIG. 33 is a schematic representation of various modules and elements of the terminal unit showing a basic manner of assembling selected ones of the various modules to each other.

FIG. 33 is a schematic representation of various modules and elements of the described terminal units showing a basic manner of assembling selected ones of the various modules to each other. In particular, the base module (334) is shown adjacent the battery module (339). The two modules may be combined initially or at a later time in that it is contemplated to facilitate the replacement of the battery module (339) without further disassembly of the respective terminal unit. The resilient spacer (341) is preferably a rubber compound which may be of a hardness to absorb a typical fall of the unit. The spacer (341) is assembled between the base module (334) and the keyboard module (321) or a similar keyboard module. A selected keyboard and display screen module is assembled to the selected keyboard module prior to this assembly to the base module (334) or its selected equivalent base module. The outer end cap (329) may be removed or initially deleted from the assembly and a CCD type scanner module (396) or a laser scanner type module (397) may be attached to the outer end (312) of the terminal unit. FIG. 33 shows such scanner modules (396) and (397) in phantom lines as alternative additions to the respective terminal unit. In maintaining the shock absorbing characteristics of the assembled terminal unit, such as terminal unit (310), if a scanner module, such as shown at (396) or (397), is included at the outer end (312) of the terminal unit (310), the scanner modules are desirably furnished with a resilient end cap (398) or (399), respectively.

Figure 34:
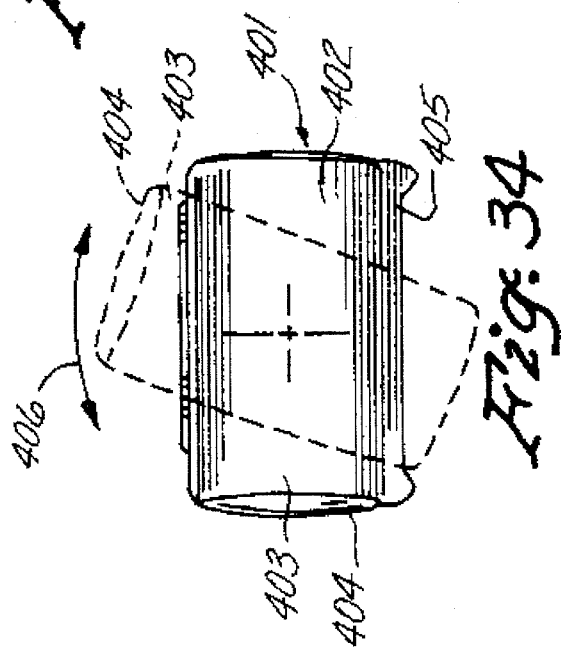
FIG. 34 is a somewhat simplified view of a data collection terminal unit in which a scanner module is mounted to an outer end of the terminal unit, the scanner module including a screen head which mounted to rotate about a longitudinal axis of the data collection terminal unit.

FIG. 34 is a simplified view onto an outer end (312) of a data collection terminal unit (401) in which a scanner module (402) is mounted to the outer end. The scanner module (402) is shown in a rest mode in which the scanner is less likely to be operated. The scanner module (402) has a scanning head (403) including an optical opening (404) through which scanned data are acquired. In the typically inactive position of the scanner module (402), any scanning would be done with the optical opening pointing toward one side of the terminal unit (401). In such position, a user is not able to direct the scanning operation straight ahead while at the same time viewing a display screen (405) on the upper face of the terminal unit (401). To overcome the limitation, the scanning head (403) is rotatably or pivotably attached to the scanner module (402) to pivot about the longitudinal central axis (314) through the terminal unit (401). Preferably, the scanning head (403) may be moved to a number of intermediate positions between the lateral positions in which the optical opening (404) points to either side of the terminal unit (401). A particular number of positions, such at fifteen degrees increments may be preferred. Thus between opposite extreme lateral positions, the scanning head may be pivoted through an angle of at least 180 degrees. An alternate, angularly disposed orientation of the scanning head (403) is shown in phantom lines as an example of the pivotable movement of the scanning head (403). The pivotable movement in either direction from the alternate position shown is indicated by an arrow (406).

Figure 35:
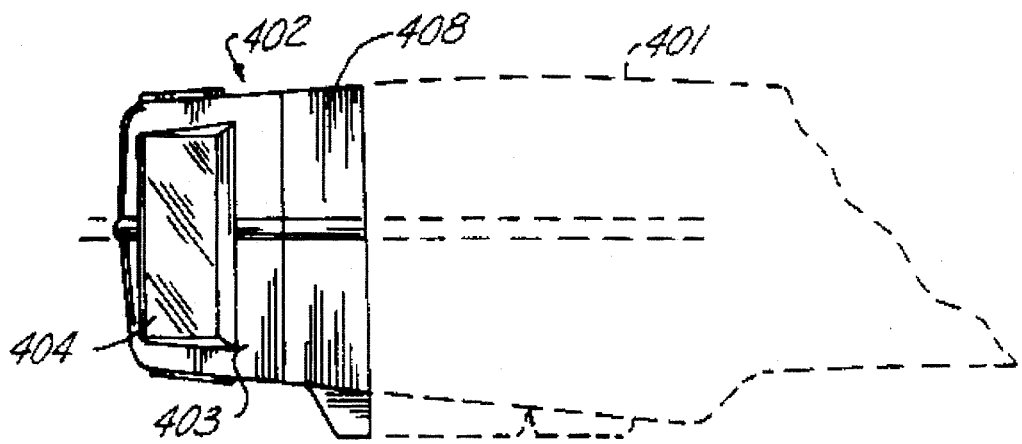
FIG. 35 is a side view of a scanner module, such as in FIG. 34, shown with the scanner head in a typical, laterally disposed rest position.

FIG. 35 shows a side view of the data collection terminal unit (401). The scanner module (402) may be attached to the outer end of the data terminal unit by removing the end cap (429) and attaching in its place a mounting base (408) of the scanner module (402). Internal data communications connections which are not shown, would include a typical data bus coupled to the microprocessor control of the data collection terminal unit (401) to permit the scanner module (402) to be operated as an integral element of the data collection terminal unit (401). The position in which the scanning head (403) is shown, is a typical rest position for the scanner module, in which the scanner would be least likely to be operated.

Figure 36:
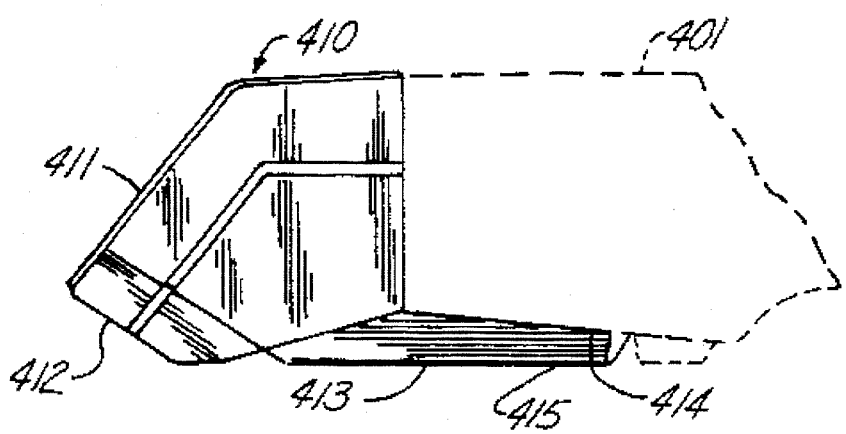
FIG. 36 is a side view of an alternate embodiment of a scanner unit, the scanner unit being fixedly attached to an outer end of the terminal unit and having a viewing direction at an angle with respect to the longitudinal axis of the data collection terminal.

FIG. 36 is a side view of an alternate embodiment of a scanner module (410). Contrary to the scanner module (402), the scanner module (410) is not pivotally attached by the base (408). Instead, a fixed scanner head (411) is shown in which the direction of scanning may preferably be at an angle in a range about 45° from the longitudinal axis of the data collection terminal unit (401). To increase the shock absorbency of the scanner module outer surface, a window portion (412) of the scanner head (411) is protected at its outer rim with preferred rubber cushioning, a shock damper having been found supportive of preventing breakage of the data collection terminal unit (401) and particularly of the scanner head (401). The scanner module (410) further comprises an inward extension (413) adjacent a lower surface (414) of the data collection terminal unit (401). A threaded fastener (415) may be used to fasten the extension (413) to the underside (414) of the data collection terminal unit (401). It should be recognized that other modifications and changes may be made with respect to the laser scanner heads attached to the outer end of the data collection terminal unit in furtherance of the objects of the invention.

Figure 37:
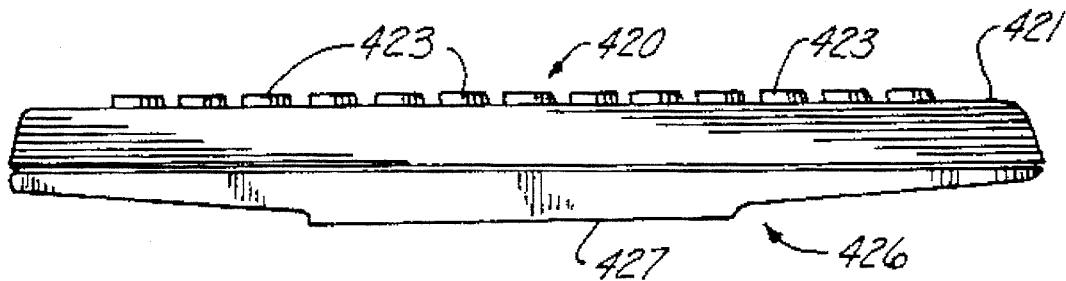
FIG. 37 is an end view of a display screen module of the type shown in FIG. 28, the end view showing an attachment surface of the display screen module.

FIG. 37 is an end view of a display screen module (420) of the type of display screen module (372) shown in FIG. 28. The end view shows an upwards directed display screen surface (421), also showing in profile, a plurality of keys (423) which may be a combination of alphanumeric keys and function keys for implementing functions of the display screen module (420). Also shown as an edge view or in profile is a sculptured lower surface (426) of the display screen module (420). Preferably, a central portion (427) of the lower surface (426) is a flat surface portion of substantially the same width as an interface surface of the respective keyboard module to which the display screen module typically mounts.

FIG. 38 shows a frontal view of the display screen module (420). An outer end (428) of the display screen module (420) may feature an antenna, such as the antenna (458) of the transceiver unit (459) shown in FIG. 26, for example. Adjacent an inward facing edge (431) of the display screen module (420) may be located an array of the plurality of keys (423) which may be alphanumeric, of numeric and a combination of function keys arranged in one or more rows as illustrated. Outward adjacent the keys (423) there is a display screen (434) capable of displaying multiple rows and columns of graphic symbols or of alphanumeric information or data. A handgrip module or handle module (435) is shown as extending toward the left hand side of the display module (420) with respect to the inner edge (431) as a base line. The handle module (435) includes a grip portion (436) which also functions as a battery compartment. A strap (437) may overlie the grip portion (436), such that a user may slip a hand between the grip portion (436) and the strap (437). The strap (437) preferably includes two strap halves which may be attached to each other at various lengthwise displaced distances by typical hook and loop fastening materials for adjustment.

FIG. 39 is a side view of the display screen module (420) and handle module (435). A battery module (438) is disposed within the hand grip portion (435). An upper lip (440) of the grip portion (436) overlies the upper surface (421) of the display screen module (420). The upper lip (440) preferably engages a retainer ridge (441) disposed on the upper surface. An identical retainer ridge (441) may be disposed on the other side of the display screen module (420), such that the handle module (435) becomes reversible and may be attached to one side as shown, or to the other side of the display screen module, depending on the preference of the user. The handle module (435) has an elongate support portion (443) which extends along the lower surface (426) of the display screen module (420) and is preferably mounted to the central portion (427) of the lower surface (426). Electrical contact between the handle module (435) and the display screen module 120 may preferably be made across an interface (444) at the central portion (427). A plurality of spaced electrical contacts (445), disposed substantially in the plane of the interface (444) establish electrical and communication contact between the handle module (435) and the respective display screen module (420). A recess (446) in the support portion (443) is part of the grip portion. Adjacent the recess (446), oppositely spaced, parallel guide tracks (447) provide for the handle module to be slidably inserted into and to become electrically coupled to an external power supply and battery charger unit (not shown). A plurality of electrical power and communication contacts (448) establish contact for electrical power and signal communication with such a power supply and battery charger unit. A transceiver module (449) may be disposed within the support portion (443) for communication between an external data device (not shown) and the display screen module (420), such that data from the external data device may be displayed to be accessible to a suer of the combination of the display screen (420) and the handle module (435). The described combination consequently refers to an alternate use of the display screen module (420) in addition to the previously described use of such a display screen module in combination with a keyboard assembly, as, for example, with respect to the data collection terminal unit (370).

FIG. 40 is a frontal view of a data collection terminal unit (450) showing a keyboard module (451). The keyboard module (451) differs from a previously described keyboard module (387), for example, in that a display screen module (453) is pivotally attached to an outer end (454) of the keyboard module (451). The display screen module (453) accordingly necessarily requires a hinged attachment to a respective module, such as the keyboard module (451). A hinge (456) includes display screen hinge members (457) and complementary hinge discs (458) of the keyboard module (450). A hinged attachment of the display screen module (453) to the keyboard module (451) shows an interleaved disposition of the disc-like, spaced hinge members (457) with the complementary hinge discs (458) of the keyboard module (451). The respective hinge members (457) and hinge discs (458) may include laterally disposed electrical contact members disposed on respectively facing surfaces thereof to couple electrical power and data communication from the keyboard module (451) to the display screen module (453). It is contemplated that the display screen module be pivoted from a first, closed position to a preferred open position selected from a range of possible positions, such as may be suitable and most convenient to a user. The keyboard module (451) may include a keyboard, such as the keyboard (388) described with respect to FIG. 32, for example. Keyboards which differ in their configuration from the configuration of the keyboard (388) but which are identical in electrical contacts and interface arrangements, and in physical dimensions may be inserted in lieu of the keyboard (388). The display screen module (453) has a first display screen (461) disposed in an outer surface (462) thereof. The size of the display screen (461) is one of choice, but may preferably be chosen to accommodate a typical numerical data display, hence be of a size substantially less than one which might occupy a major portion of the outer surface (462) of the display screen module (453). Similarly to the embodiment described in reference to FIG. 26, the data collection terminal unit (450) may include a transceiver unit (359) as indicated by the antenna (358).

FIG. 41 is a side view of the data collection terminal unit (450). The terminal unit (450) includes a typical base module (465), similar to the base module (334) described with respect to FIG. 24 hereof. The base module (465) is shown as including the handgrip portion (335) and the strap (336). Resilient, shock absorbing end caps (328) and (329) are desirably attached to the respective inner and outer ends (311) and (312) of the data collection terminal unit (450). The display screen module (453) is shown in the first or closed position. The closed position is considered also the normal position in which the module (453) is disposed essentially against an outward disposed portion (467) of the keyboard module (451). The display screen module (453) may however, be pivoted into an upward or open position within a range of open positions, substantially as indicated by the alternate position of the display screen module (453) shown in phantom lines. As the display screen module is pivoted to such upward position, a second display screen (319) disposed on the normally hidden underside (468) becomes visually accessible to a user. The display screen (319) is preferably recessed with an outer rim (469) of the display screen module (453). In the downward pivoted position the display screen module (453) may cover an auxiliary or second keyboard (471). The additional keys (472) of the second keyboard (471) may add alphabetical keys and function keys to be accessed by the user. In achieving the advantages sought by the present invention, both the first and the second keyboards (388) and (421) are removably mounted to the keyboard module (451) and may be exchanged for keyboards of identical lateral extent and having different key arrangements on a front surface thereof. Thus, the keyboard (471) may be exchanged for another keyboard having keys for different data or control input to the respective data collection terminal unit. Also, depending on the type of operation contemplated by the user of the data collection terminal unit (450), the user may employ the unit with the display screen module (453) in a downward position with the first keyboard (388) being the sole keyboard available for data entry and the first display screen (461) providing a corresponding visual indication of data made available to the user. In the alternative, the user may pivot the display screen module into an upward pivoted position, giving access to a second display screen (319) which is in comparison to the first display screen (461) larger in active area and capable of displaying a greater amount of information. The second keyboard (471) to which the user has gained access simultaneously with the access to the relatively larger display screen (319) desirably provides the capability of alphabetical data information. Electrical provision in the hinge (456) may include position controlled contacts (474) which selectively activate the display screen (461) or the display screen (319) in response to an opening or closing of the display screen module (453) in the manner described. The display screen module (453) differs from the previously described display screen modules in that the display screen module (453) is hingedly attached to the respective keyboard module (451). In this manner, the display screen module (453) may be interchanged with other display screen modules having similar spaced hinge members (457) to be compatible with the hinge discs (458) of the keyboard module (451).

Figure 42:
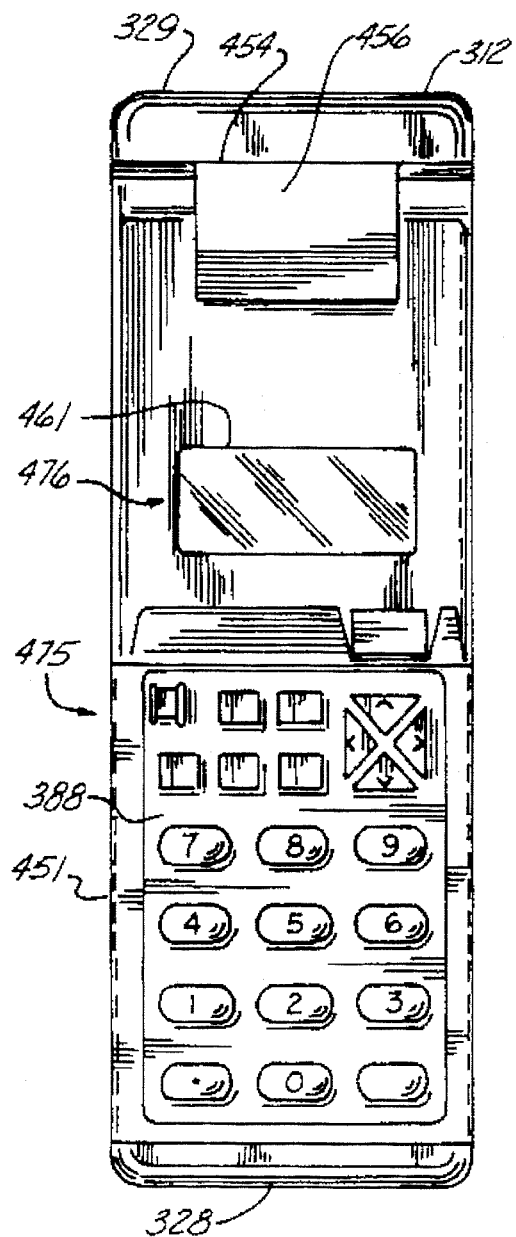
FIG. 42 is yet another embodiment of the data collection terminal unit shown in FIGS. 40 and 41, showing a screen display confined to the width of the keyboard module of the data collection terminal unit.

FIG. 42 is a frontal view of such alternate embodiment, showing a data collection terminal unit (475) which includes the described keyboard module (451). To the outer end (454) of the keyboard module (451) a display screen module (476) has been pivotally attached in lieu of the already described display screen module (453). In clear contrast to the display screen module (453), the display screen module (476) is laterally confined substantially to the overall width of the keyboard module (451) of the data collection terminal unit (475). The attachment of the display screen module (476) to the keyboard module (451) is identical to the attachment of the display screen module (453) at the hinge (456) as previously described. In the closed position of the display screen module (476), the first or outer display screen (461) may preferably be identical to the first display screen of the display screen module (453) in that in the closed position of the display screen module (476) only the first keyboard, preferably the numerical keyboard (388) is accessible to the user, and the size and display area of the display screen (461) is adapted to a desired display format commensurate with data input from the first keyboard, such as the keyboard (388).

Figure 43:
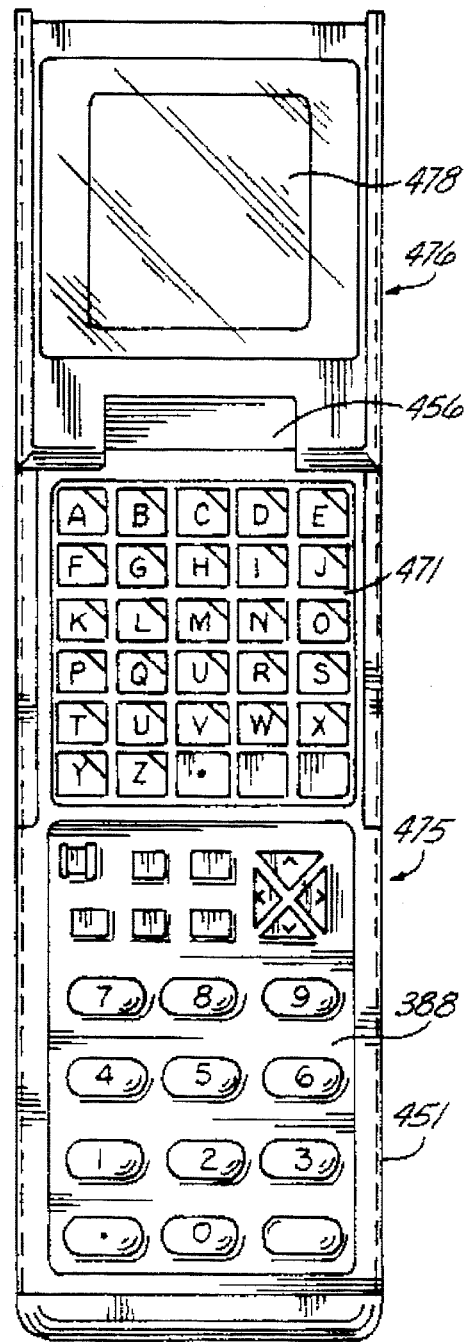
FIG. 43 is an alternate frontal view of the data collection terminal unit shown in FIG. 42 showing a pivotally mounted screen display in an open position, revealing a second screen display and a second keyboard.

FIG. 43 is an alternate frontal view of the data collection terminal unit (475), showing the display screen module (476) in an upward pivoted position. The pivoted position reveals the second keyboard (471) of the keyboard module (451) and makes a second display screen (478) of the display screen module (476) accessible to the user. Consequently, as shown in FIG. 43, the user may now manually enter data by manipulating any of the keys which make up the keyboards (388) and (471). The combination of the substantially numerical keyboard (388) and the substantially alphabetical keyboard (471) results in a complete alphanumerical keyboard. As described, pivoting the display screen module (476) from a closed position, as shown in FIG. 42, to the open position of FIG. 43, would be effective in one embodiment to switch displayed information from the first display screen (461) to the second display screen (478).

Accordingly, it will be appreciated that the preferred embodiment disclosed herein does indeed accomplish the aforementioned objects. Obviously, many modifications and variations of the present invention are possible in light of the above teachings. It is therefore to be understood that, within the scope of the appended claims, the invention may be practiced otherwise than as specifically described.

We claim:

1. A modular hand-held data collection terminal unit comprising:

(a) a display screen assembled with said terminal unit;

(b) a keyboard assembled with said terminal unit:

(c) wherein the terminal unit further comprises a scanning module;

(d) wherein the scanning module is attached to an outer end of the terminal unit;

(e) said terminal unit having a broad user interface side comprising said display screen and said keyboard and having a broad handgrip side opposite said user interface side, said terminal unit having a frontal disposition with the user interface side facing the user;

(f) said terminal unit having respective lateral edge faces one of which is proximal to the user and one of which is remote from the user in each of first and second respective edgewise dispositions of the terminal unit wherein the terminal unit is supported by the left hand and right hand respectively;

(g) said scanning module comprising an automatic reader unit housing containing an automatic reader unit which effects an automatic reading operation without requiring movement of the terminal unit as a whole;

(h) said automatic reader unit housing being orientable in respective opposite lateral directions relative to the terminal unit, so that the automatic reader unit may be oriented to be directed laterally away from the user during an automatic reading operation whether the terminal unit is to be supported in the first edgewise disposition with the left hand of the user, or whether the terminal unit is to be supported in the second edgewise disposition with the right hand of the user; and (i) manually actuatable selectors arranged correspondingly on the respective lateral edge faces of the terminal unit for convenient actuation by the left or right hand whichever is to grip the terminal unit at said handgrip side.

2. The terminal unit according to claim 1, wherein the display screen is of modular construction to form a display screen module and is selected as a preferred one of a plurality of display screen modules of different sizes available for assembly into said terminal unit.

3. The terminal unit according to claim 2, wherein the keyboard is of modular construction to form a keyboard module and is selected as a preferred one of a plurality of functionally different keyboard modules and including differently configured keys available for assembly into said terminal unit, the selected display screen module being attached to one end of the selected keyboard module.

4. The terminal unit according to claim 1, wherein said automatic reader unit housing contains a non-contact cyclically deflected laser beam reader for supplying a processed reader signal from the automatic reader unit housing to the remainder of the terminal unit in each of the orientations of the automatic reader unit housing relative thereto.

5. The terminal unit according to claim 1, wherein said automatic reader unit housing contains a non-contact automatic instant reader of the image photosensor type for supplying a processed reader signal from the automatic reader unit housing to the remainder of the terminal unit in each of the orientations of the automatic reader unit housing relative thereto.

* * * * *